(12) United States Patent
Kwon et al.

(10) Patent No.: US 8,988,429 B2
(45) Date of Patent: Mar. 24, 2015

(54) APPARATUS AND METHOD FOR GENERATING DEPTH INFORMATION

(75) Inventors: Oh-jae Kwon, Suwon-si (KR); Ji-bum Moon, Seoul (KR); Han-soo Kim, Seongnam-si (KR); Young-wook Sohn, Yongin-si (KR); Seo-young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 13/608,630

(22) Filed: Sep. 10, 2012

(65) Prior Publication Data

US 2013/0063430 A1  Mar. 14, 2013

(30) Foreign Application Priority Data

Sep. 8, 2011  (KR) .................... 10-2011-0091308

(51) Int. Cl.
*G06T 15/00* (2011.01)
*G06T 17/00* (2006.01)
*H04N 13/02* (2006.01)

(52) U.S. Cl.
CPC .............................. *H04N 13/0271* (2013.01)
USPC ........................................ 345/420; 345/419

(58) Field of Classification Search
USPC ................................................. 345/418–422
See application file for complete search history.

(56) References Cited

U.S. PATENT DOCUMENTS

| 6,208,348 | B1 * | 3/2001 | Kaye ............................ 345/419 |
| 6,515,659 | B1 * | 2/2003 | Best et al. ..................... 345/419 |
| 7,668,377 | B2 | 2/2010 | Curti et al. |
| 7,726,767 | B2 | 6/2010 | Noguchi et al. |
| 2005/0099414 | A1 * | 5/2005 | Kaye et al. ..................... 345/419 |
| 2009/0116732 | A1 * | 5/2009 | Zhou et al. .................... 382/154 |
| 2009/0237523 | A1 * | 9/2009 | Date et al. .................. 348/222.1 |
| 2010/0086199 | A1 | 4/2010 | Kim et al. |
| 2012/0269424 | A1 * | 10/2012 | Ebata et al. ................... 382/154 |

FOREIGN PATENT DOCUMENTS

KR  1020080065889 A  7/2008

* cited by examiner

*Primary Examiner* — James A Thompson
(74) *Attorney, Agent, or Firm* — Sughrue Mion, PLLC

(57) ABSTRACT

An apparatus for generating depth information includes: a receiver which receives a two-dimensional (2D) image signal including a plurality of frames; a user input unit; a user interface (UI) generator which generates a tool UI to input guide information for generating depth information; a display unit which displays a frame for which depth information is generated among the plurality of frames, and the generated tool UI; and a depth information generator which generates depth information corresponding to the guide information input by the user input unit through the tool UI.

50 Claims, 21 Drawing Sheets

(LOCATION OF 665A)

(DEGREE OF CURVE OF DEPTH VALUE)

(LOCATION OF 665A)

(DEGREE OF CURVE OF DEPTH VALUE)

(LOCATION OF 665A)

(DEGREE OF CURVE OF DEPTH VALUE)

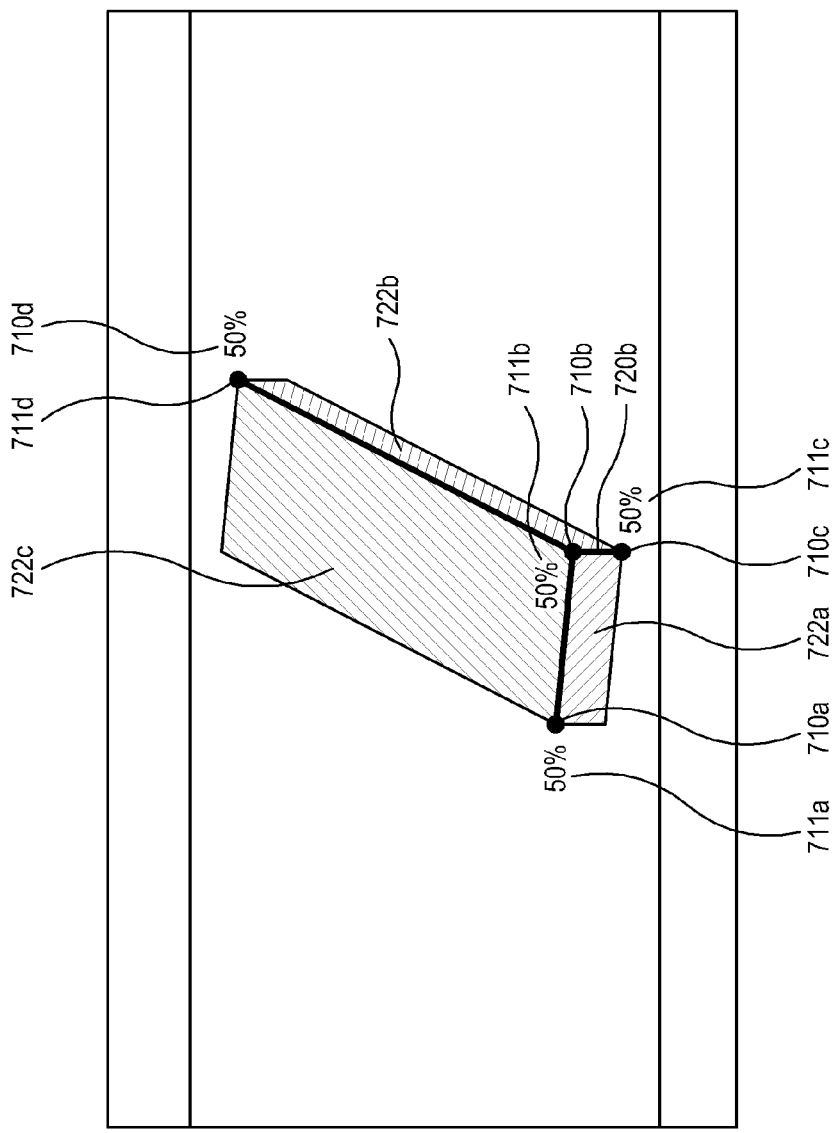

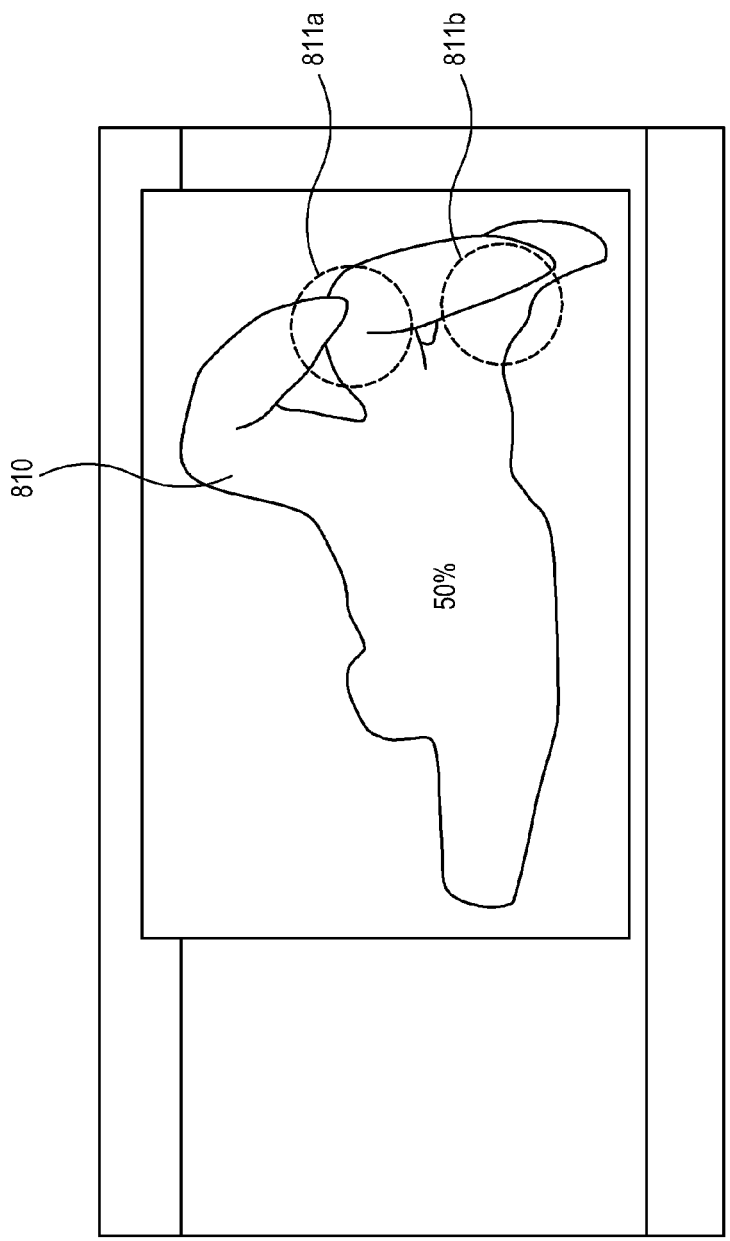

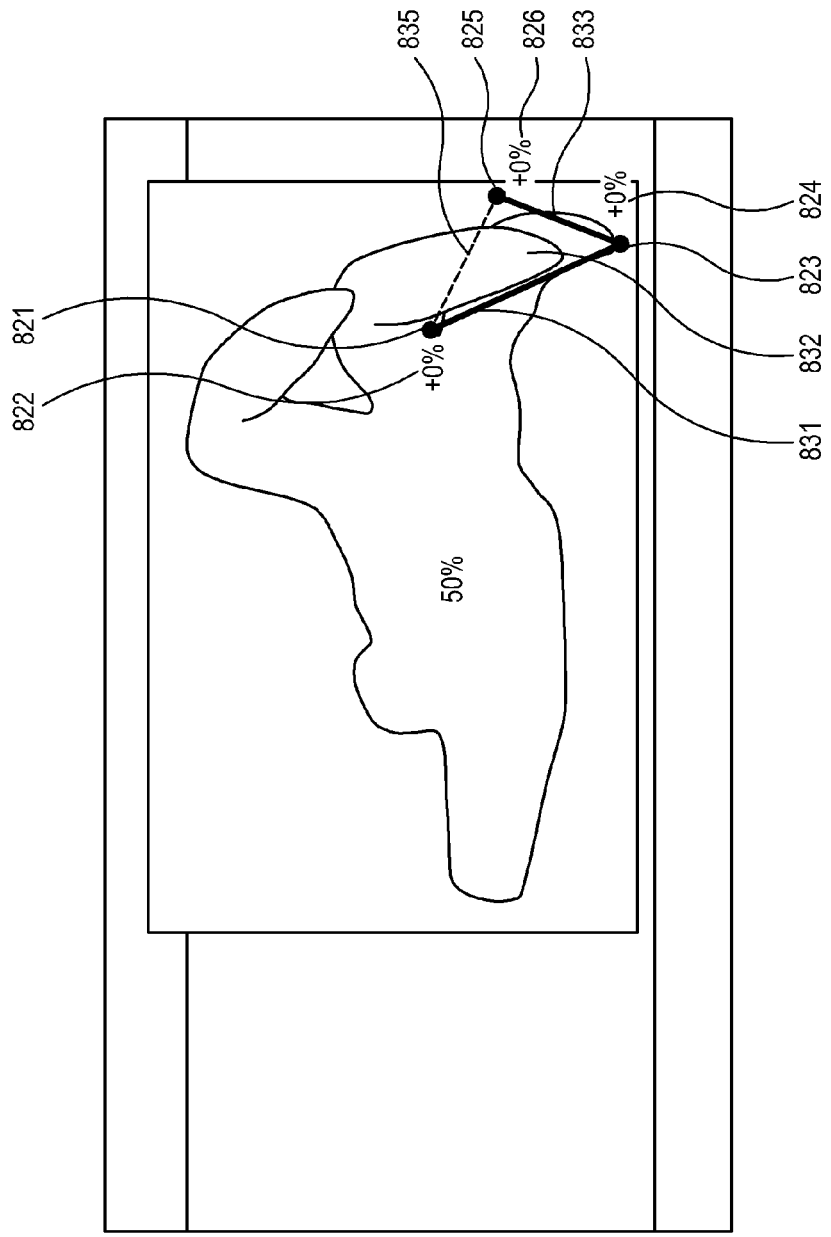

APPARATUS AND METHOD FOR GENERATING DEPTH INFORMATION

CROSS-REFERENCE TO RELATED APPLICATION

This application claims priority from Korean Patent Application No. 10-2011-0091308, filed Sep. 8, 2011 in the Korean Intellectual Property Office, the disclosure of which is incorporated herein by reference in its entirety.

BACKGROUND

1. Field

Apparatuses and methods consistent with exemplary embodiments relate to generating depth information, and more particularly, to generating depth information for converting a two-dimensional (2D) input image into a three-dimensional (3D) image.

2. Description of the Related Art

To convert a 2D image including a plurality of frames to a 3D image, depth information is generated to provide the 3D effect. However, generating the depth information for all of the frames of the 2D image takes a great amount of time and is not cost-efficient.

SUMMARY

Exemplary embodiments may address at least the above problems and/or disadvantages and other disadvantages not described above. Also, exemplary embodiments are not required to overcome the disadvantages described above, and an exemplary embodiment may not overcome any of the problems described above.

Exemplary embodiments provide an apparatus and a method for generating depth information including a depth information generating tool to generate depth information with less time and by a cost-efficient method and a computer-readable storage medium which is encoded by an instruction executed by a computer by the method thereof.

According to an aspect of an exemplary embodiment, there is provided an apparatus for generating depth information including: a receiver which receives a 2D image signal including a plurality of frames; a user input unit; a user interface (UI) generator which generates a tool UI to input guide information for generating depth information; a display unit which displays a frame for which depth information is generated among the plurality of frames, and the generated tool UI; and a depth information generator which generates depth information corresponding to the guide information input by the user input unit through the tool UI.

The guide information which is input through the tool UI may be input as at least one of a dot, line and diagram on a frame displayed on the display unit.

The guide information may be plurally input through the tool UI, and the depth information generator may generate depth information based on the plurality of input guide information.

The tool UI may include a first UI which is shaped like a dot, and the depth information generator may extract location and color information of the first UI on the frame and divide a first area having color information belonging to a predetermined range from the extracted color information on the frame if a location of the frame is designated through the first UI.

The depth information generator may automatically generate preset first depth information corresponding to the first UI for the divided first area.

The first UI may further include a first sub UI to adjust the first depth information, and the depth information generator may generate second depth information based on a user's input that is input through the first sub UI for the divided first area.

The tool UI may further include a second UI which is shaped like a line or diagram, and the depth information generator may extract location information of the second UI on the frame, and divide the frame into a plurality of second areas based on the extracted location information.

The depth information generator may automatically generate preset third depth information corresponding to the second UI for the plurality of second areas.

The second UI may further include a second sub UI to adjust the third depth information, and the depth information generator may generate fourth depth information based on a user's input that is input through the second sub UI for the plurality of second areas.

The depth information generator may divide the frame into a plurality of third areas based on a user's input through the second UI, and automatically generate preset fifth depth information having a depth value that is far from a user when it is close to a location corresponding to a user's input through the first UI for the third area, and having a depth value that is close to a user when it is far from a location corresponding to a user's input through the first UI if a plurality of user's inputs is input through the first and second UIs.

The depth information generator may automatically generate preset fifth depth information having a depth value that is far from a user when it is close to a location corresponding to a user's input through the first UI for the entire area of the frame and having a depth value that is close to a user when it is far from a location corresponding to a user's input through the first UI if a process for dividing the frame into the third areas through the first and second UIs is omitted.

The depth information generator which generates depth information corresponding to the input guide information may include the divided first, second and third areas which overlap each other, and generate single depth information by combining depth information generated for each overlapping area.

According to another aspect of an exemplary embodiment, there is provided a method for generating depth information including: receiving a 2D image signal including a plurality of frames; generating a tool UI which is used to input guide information for generating depth information; displaying a frame for which depth information is generated among the plurality of frames, and the generated tool UI; receiving input for guide information from a user through the displayed tool UI; and generating depth information corresponding to the input guide information.

The guide information which is input through the tool UI may be input as at least one of a dot, line and diagram on a frame displayed on the display unit.

The guide information may be plurally input through the tool UI, and the generating the depth information may include generating depth information based on the plurality of input guide information.

The tool UI may include a first UI which is shaped like a dot, and the method may further include extracting location and color information of the first UI on the frame and dividing a first area having color information belonging to a predetermined range from the extracted color information on the frame if a location of the frame is designated through the first UI.

The generating the depth information may include automatically generating preset first depth information corresponding to the first UI for the divided first area.

The first UI may further include a first sub UI to adjust the first depth information, and the generating the depth information may include generating second depth information based on a user's input that is input through the first sub UI for the divided first area.

The tool UI may further include a second UI which is shaped like a line or diagram, and the method may further include extracting location information of the second UI on the frame, and dividing the frame into a plurality of second areas based on the extracted location information.

The generating the depth information may include automatically generating preset third depth information corresponding to the second UI for the plurality of second areas.

The second UI may further include a second sub UI to adjust the third depth information, and the generating the depth information may include generating fourth depth information based on a user's input that is input through the second sub UI for the plurality of second areas.

The generating the depth information may further include dividing the frame into a plurality of third areas based on a user's input through the second UI, and automatically generating preset fifth depth information having a depth value that is far from a user when it is close to a location corresponding to a user's input through the first UI for the third area, and having a depth value that is close to a user when it is far from a location corresponding to a user's input through the first UI if a plurality of user's inputs is input through the first and second UIs.

The generating the depth information may further include automatically generating preset fifth depth information having a depth value that is far from a user when it is close to a location corresponding to a user's input through the first UI for the entire area of the frame and having a depth value that is close to a user when it is far from a location corresponding to a user's input through the first UI if a process for dividing the frame into the third areas through the first and second UIs is omitted.

The generating the depth information may include overlapping the divided first, second and third areas, and generating single depth information by combining depth information generated for each overlapping area.

According to another aspect of an exemplary embodiment, there is provided a computer-readable storage medium which records a program to execute by a computer by the method according to one of the foregoing methods.

According to another aspect of an exemplary embodiment, there is provided an apparatus for generating depth information including: a receiver which receives a 2D image signal which includes a plurality of frames; a user input unit; a UI generator which generates a tool UI to input guide information for generating depth information; a display unit which displays a frame for which depth information is generated among the plurality of frames, and the generated tool UI; and a depth information generator which partitions an object among the displayed frames, and generates depth information corresponding to the guide information for the divided object if the guide information is input through the tool UI in a predetermined location within the divided object.

The guide information may be plurally input through the tool UI in a plurality of locations within the object, and the depth information generator may generate depth information based on the plurality of input guide information for the object.

The tool UI may include a first UI which occupies a first area and has a predetermined shape including a vertex, and the first UI may be used to adjust a location of the vertex through the user input unit to adjust at least one of size and location of the first area.

The first UI may further include a first sub UI to display and adjust preset depth information, and the depth information generator may generate first depth information based on a user's input that is input through the first sub UI for the first area designated through the first UI.

The first sub UI may be located and displayed on a vertex of the first UI.

The tool UI may include a second UI which is shaped like a dot, and the second UI may further include a second sub UI to display and adjust preset depth information, and the depth information generator may generate second depth information based on a user's input that is input through the second sub UI for a preset second area in a predetermined size centering on an area where the second UI is located.

The second UI may further include a third sub UI to adjust the size of the second area.

The second UI may further include a fourth sub UI that is located in an edge of the second area and is used to input third depth information, and a fifth sub UI to adjust a degree of curve of a depth value that gradually increases and decreases between the second and third depth information.

The second UI may be adjusted in location within the second area.

The second UI may further include a sixth sub UI to adjust at least one of rotation and inclination of the second area.

The tool UI may include a third UI to occupy a third area having the width of the second area and a length of a plurality of second UIs connected by connecting the plurality of second UIs, and the depth information generator may generate the second depth information with respect to the third area.

The tool UI may further include a fourth UI which is shaped like a line that connects the plurality of second UIs, and the depth information generator may extract location information of a fourth UI within the object and divide the object into a plurality of fourth areas based on the extracted location information and generates the second depth information with respect to the fourth area.

The tool UI may connect the plurality of second UIs and include a fifth UI to occupy a fifth area which is formed by connecting the plurality of second UIs, and the depth information generator may generate the second depth information with respect to the fifth area.

According to another aspect of an exemplary embodiment, there is provided a method for generating depth information including: receiving a 2D image signal which includes a plurality of frames; generating a tool UI to input guide information for generating depth information; displaying a frame for which depth information is generated among the plurality of frames, and the generated tool UI; dividing an object among the displayed frames; inputting guide information through the tool UI in a predetermined location within the divided object; and generating depth information corresponding to the input guide information for the divided object.

The generating the depth information may further include generating depth information based on a plurality of input guide information for the object if the plurality of guide information is plurally input through the tool UI in a plurality of locations within the object.

The tool UI may include a first UI which occupies a first area and has a predetermined shape including a vertex, and the first UI may be used to adjust a location of the vertex through the user input unit to adjust at least one of size and location of the first area.

The first UI may further include a first sub UI to display and adjust preset depth information, and the generating the depth information may include generating first depth information based on a user's input that is input through the first sub UI for the first area designated through the first UI.

The first sub UI may be located and displayed on a vertex of the first UI.

The tool UI may include a second UI which is shaped like a dot, and the second UI may further include a second sub UI to display and adjust preset depth information, and the generating the depth information may include generating second depth information based on a user's input that is input through the second sub UI for a preset second area in a predetermined size centering on an area where the second UI is located.

The second UI may further include a third sub UI to adjust the size of the second area.

The second UI may further include a fourth sub UI that is located in an edge of the second area and is used to input third depth information, and a fifth sub UI to adjust a degree of curve of a depth value that gradually increases and decreases between the second and third depth information.

The second UI may be adjusted in location within the second area.

The second UI may further include a sixth sub UI to adjust at least one of rotation and inclination of the second area.

The tool UI may include a third UI to occupy a third area having the width of the second area and a length of a plurality of second UIs connected by connecting the plurality of second UIs, and the generating the depth information may include generating the second depth information with respect to the third area.

The tool UI may further include a fourth UI which is shaped like a line that connects the plurality of second UIs, and the generating the depth information may include extracting location information of a fourth UI and dividing the object into a plurality of fourth areas based on the extracted location information, and generating the second depth information with respect to the fourth area.

The tool UI may connect the plurality of second UIs and include a fifth UI to occupy a fifth area which is formed by connecting the plurality of second UIs, and the generating the depth information may include generating the second depth information with respect to the fifth area.

Still another aspect may be achieved by providing a computer-readable storage medium which records a program to execute by a computer by the method according to one of the foregoing methods.

BRIEF DESCRIPTION OF THE DRAWINGS

The above and/or other aspects will become apparent by describing certain exemplary embodiments, with reference to the accompanying drawings, in which:

FIG. 13 illustrates an example of a fourth tool UI generated by the depth information generator according to an exemplary embodiment of the apparatus for generating depth information of FIG. 1;

FIGS. 14A and 14B illustrate an example of a fifth tool UI generated by the depth information generator according to an exemplary embodiment of the apparatus for generating depth information of FIG. 1;

DETAILED DESCRIPTION OF EXEMPLARY EMBODIMENTS

Figure 1:
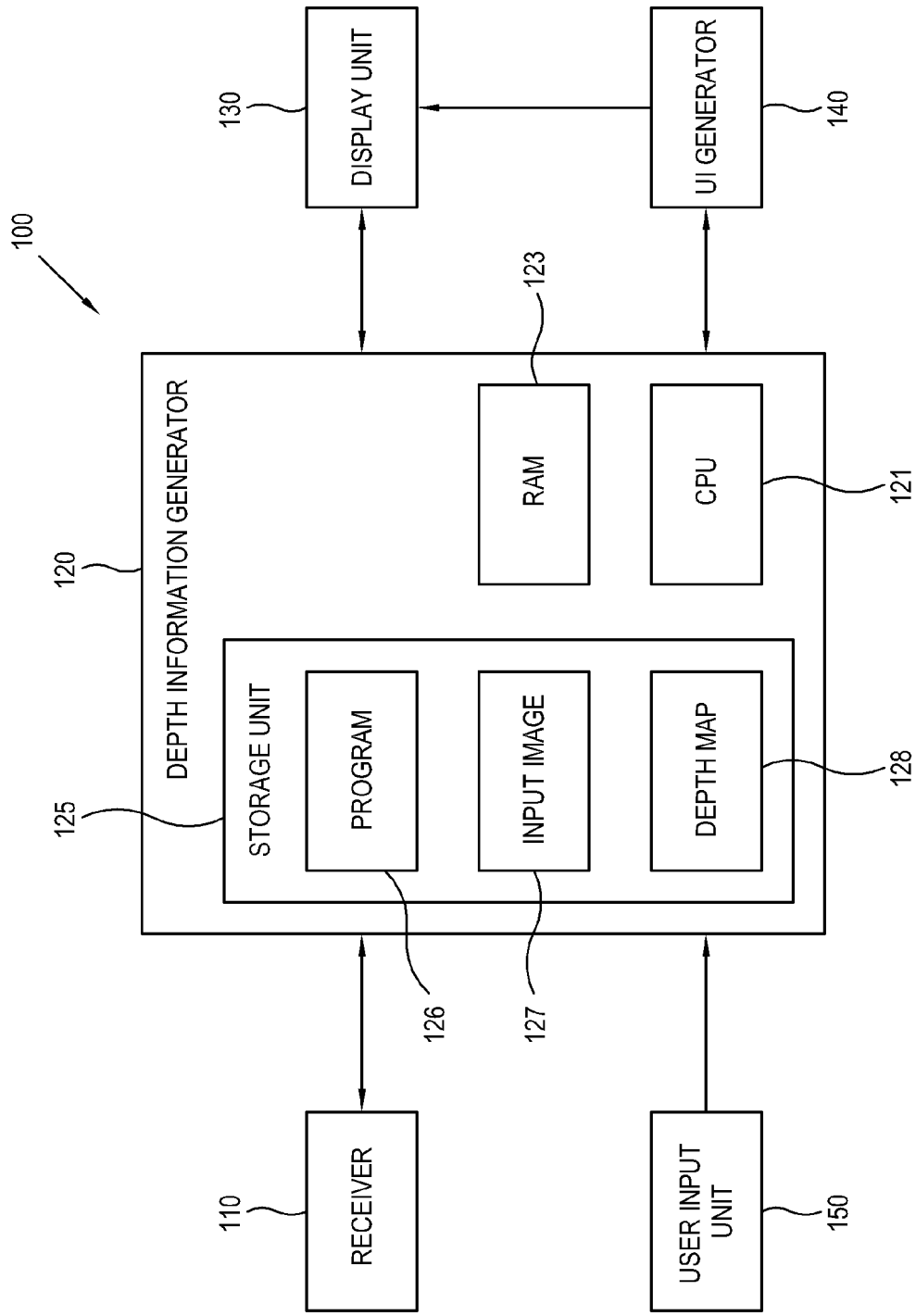
FIG. 1 is a control block diagram of an apparatus for generating depth information according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be carried out without those specifically defined matters. Also, well-known functions or constructions are not described in detail since that would obscure the invention with unnecessary detail.

FIG. 1 is a control block diagram of an apparatus for generating depth information according to an exemplary embodiment.

As shown therein, an apparatus for generating depth information 100 includes a receiver 110, a depth information generator 120, a display unit 130, a UI generator 140 and a user input unit 150.

The apparatus for generating depth information 100 may include any type of electronic apparatus which generates depth information for converting a 2D image that is transmitted by a source supply device (not shown), into a 3D image. For example, the apparatus for generating depth information 100 may include a display apparatus, such as a personal computer (PC).

A 3D image uses a binocular parallax, that is disparity of visual angles of both eyes of a viewer. The 3D image may include a plurality of left eye frames and a plurality of right eye images. At least a pair of a left eye frame and a right eye frame of the plurality of left eye frames and right eye frames may be converted from at least one of a plurality of frames of a 2D image which is transmitted by a source supply device (not shown).

The receiver 110 receives a plurality of frames which consists of a 2D image from the source supply source. The receiver 110 may receive a plurality of frames consisting of the 2D image from the source supply device through a predetermined network (not shown), and include a predetermined communication module to communicate with the network. The source supply device may include, e.g., a network server, and store a 2D image and transmit the 2D image to the apparatus for generating depth information 100 at the request of the apparatus for generating depth information 100.

For example, the source supply device may include an external storage medium which includes a storage means, such as a hard disk or a flash memory, to store a 2D image. The apparatus for generating depth information 100 is connected to the source supply device as a local device through the receiver 100, and the source supply device may transmit a 2D image to the apparatus for generating depth information 100 at the request of the apparatus for generating depth information 100. For example, the receiver 110 may include a module for realizing a local connection method for the apparatus for generating depth information 100 and the source supply device. The receiver 110 may include a universal serial bus (USB) module or the like device.

The depth information generator 120 may generate depth information which is used to convert a 2D image that is received by the receiver 110, into a 3D image. The depth information generator 120 may include a central processing unit (CPU) 121, a random access memory (RAM) 123 and a storage unit 125.

The storage unit 125 may store a program 126 for generating depth information to generate depth information used to convert an input 2D image into a 3D image, a 2D input image 127, and a depth map 128 generated by the program 126 with respect to the 2D image. The storage unit 125 may include a non-volatile memory, such as a hard disk or a flash memory. At least a part of the program 126 for generating depth information is loaded to the RAM 123 upon operation of the depth information generator 120, and the CPU 121 executes the program 126 for generating depth information loaded to the RAM 123. The program 126 for generating depth information has instructions which are executed by the CPU 121. The storage unit 125 is an example of a computer-readable storage medium.

The performance of the depth information generator 120 according to an exemplary embodiment is as follows.

If the program 126 for generating depth information is executed by the CPU 121, the CPU 121 controls the UI generator 140 (to be described later) to generate a tool UI to input guide information for generating depth information. By a control of the CPU 121, a 2D image including a plurality of frames that is received by the receiver 110 and the tool UI are displayed together on the display unit 130 (to be described later). The program 126 for generating depth information generates depth information based on the guide information input through the tool UI. The operation of the depth information generator 120 according to this exemplary embodiment is described in detail with reference to FIGS. 2 to 5.

The performance of the depth information generator 120 according to another exemplary embodiment is as follows.

If the program 126 for generating depth information is executed by the CPU 121, the CPU 121 controls the UI generator 140 (to be described later) to generate a tool UI to input guide information for generating depth information. By a control of the CPU 121, a 2D image including a plurality of frames that is received by the receiver 110 and the tool UI are displayed together on the display unit 130 (to be described later). The program 126 for generating depth information partitions an object of a frame displayed on the display unit 130, and generates depth information based on the guide information for the partitioned object if the guide information is input to a predetermined location of the partitioned object through the generated tool UI. The operation of the depth information generator 120 according to this exemplary embodiment is described in detail with reference to FIGS. 6 to 14.

The display unit 130 displays a 2D image including a plurality of frames which is received by the receiver 110 and a tool UI generated by the UI generator 140. That is, the display unit 130 displays a frame for which depth information is generated among the plurality of frames and a tool UI to input guide information for generating depth information. The display unit 130 may include, but not limited to, various display types, such as liquid crystal, plasma, light-emitting diode, organic light-emitting diode, surface-conduction electron-emitter, carbon nano-tube, and a nano-crystal.

The UI generator 140 may generate a tool UI to input guide information for generating depth information. The generated UI may include a graphic user interface (GUI). The tool UI is used for generating depth information, and may perform its operation by a control of the CPU 121 of the depth information generator 120. The tool UI which is generated by the UI generator 140 is described in detail below.

The user input unit 150 is a UI for receiving a user's input and receives a user's selection relating to a function or operation of the apparatus for generating depth information 100. The user input unit 150 may include at least one key button, and may be a manipulation panel or touch panel which is provided in the apparatus for generating depth information 100. The user input unit 150 may be a remote controller, a keyboard, a mouse or a pointer which is connected to the apparatus for generating depth information 100 in a wired or wireless manner.

The apparatus for generating depth information 100 displays on the display unit 130 one of a plurality of frames consisting of the 2D image received by the receiver 110, and displays on the display unit 130 at least one tool UI generated by the UI generator 140 upon receiving an input of a particular key from the user input unit 150. A plurality of tool UIs may be displayed on the display unit 130. A plurality of tool UIs may be selected to input pieces of guide information according to a plurality of user's inputs. The apparatus for generating depth information 100 may generate depth information based on the plurality of pieces of input guide information.

The guide information which may be input through the tool UI may be input as at least one of a dot, line and diagram on the frame displayed on the display unit 130.

A. Example 1 of Tool UI

Figure 2:
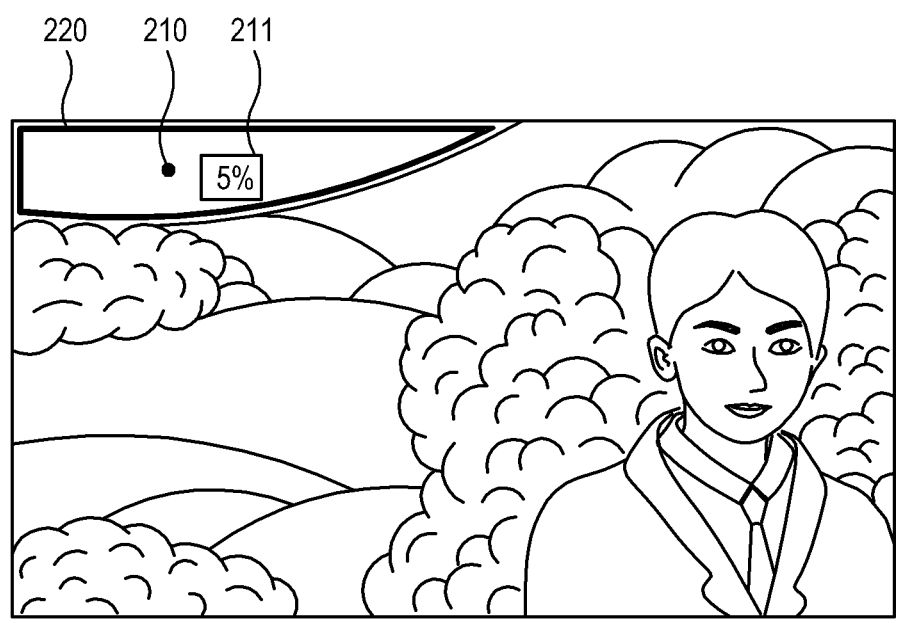
FIG. 2 illustrates an example of a first tool UI generated by a depth information generator according to an exemplary embodiment of the apparatus for generating depth information of FIG. 1.

FIG. 2 illustrates a tool UI which includes a first tool UI shaped like a dot. The display unit 130 displays a plurality of tool UIs, and the depth information generator 120 extracts location and color information of a first tool UI 210 displayed on the display unit 130 if the first tool UI 210 shaped like a dot is selected by a user's input through the user input unit 150. That is, coordinates X and Y and color information of the first tool UI 210 on the frame are extracted. The depth information generator 120 partitions a first area 220 having color information belonging to a predetermined scope from the extracted color information on the frame. That is, the depth information generator 120 partitions the first area 220 having the color information which is the same as or similar to the extracted color information. The depth information generator 120 may determine the characteristic of the first area 220, such as a sky, sea, wall, field, mountain, object, etc., from the extracted location information and color information. The depth information generator 120 may determine that the first area 220 is a sky by using the location and color information of the first area 220, and automatically generate preset first depth information if the first area 220 is a sky. The first tool UI further includes a first sub UI to adjust the first depth information, and the first sub UI 211 is generated and displayed upon receiving a particular key input from the user input unit 150. For example, a user may input a particular depth value of 5% through the first sub UI 211, as a depth value, while depth information has the range of 0 to 100%. A lower percentage may provide the 3D effect as if an object is far from a user, and a higher percentage may provide the 3D effect as if the object is close to a user. The depth information generator 120 may generate second depth information for the partitioned first area 220 based on the user's input, such as for example 5%. Accordingly, the depth information generator 120 may partition the first area and generate depth information based on the guide information input through the first tool UI.

Accordingly, when a user marks with a dot, described above as the first tool UI, through the user input unit 150 which includes a pointer or a mouse on an area for which depth information is generated, the depth information generator 120 may partition an area belonging to a certain range of the location where the dot is marked and generate depth information automatically or according to a user's input to thereby generate depth information without difficulty.

B. Example 2 of Tool UI

Figure 3:
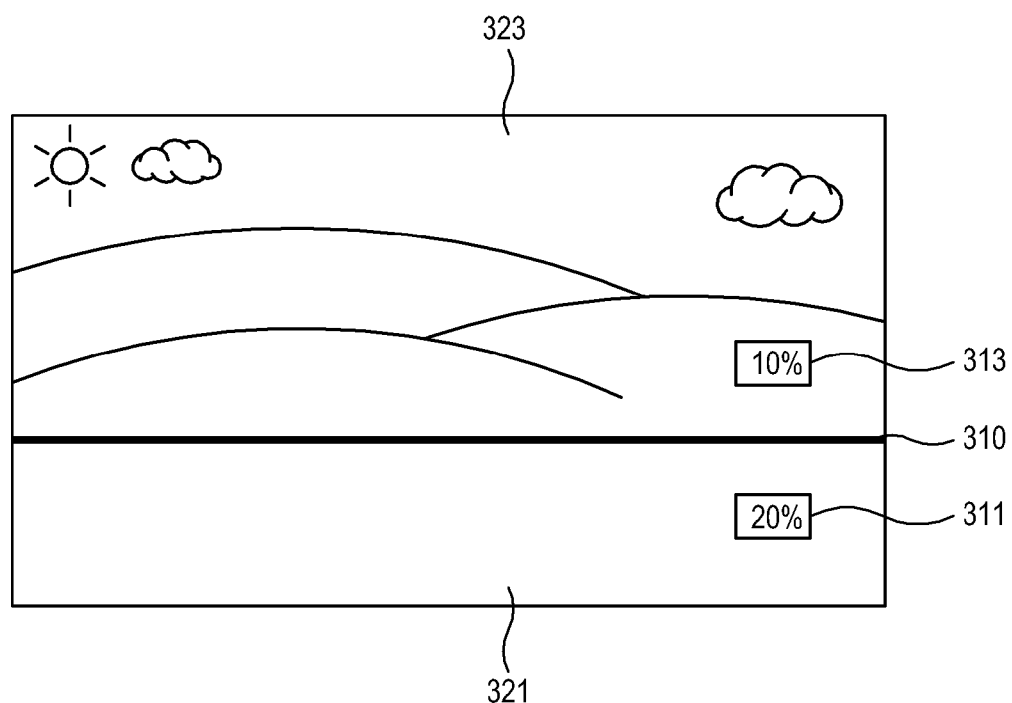
FIGS. 3 and 4 illustrate an example of a second tool UI generated by the depth information generator according to an exemplary embodiment of the apparatus for generating depth information of FIG. 1.

FIG. 3 illustrates a tool UI which includes a second tool UI shaped like a line.

If a second tool UI 310 shaped like a line is selected according to a user's input through the user input unit 150 on a frame displayed on the display unit 130, the depth information generator 120 extracts location and color information of the second tool UI 310 on the frame displayed on the display unit 130. That is, the depth information generator 120 extracts coordinates X and Y and color information of the second tool UI 310 on the frame. The depth information generator 120 partitions the frame into a plurality of second areas 321 and 323 based on the location information of the second tool UI 310.

The depth information generator 120 may determine the characteristic of the second areas 321 and 323, such as a sky, sea, wall, field, mountain or object, from the extracted location information and color information. The depth information generator 120 may determine that the second area 321 is a field based on the location and color information of the second area 321, and may automatically generate preset third depth information if the second area 321 is a field.

The second tool UI further includes one or more second sub tool UIs to adjust the third depth information, and generates and displays second sub tool UIs 311 and 313 upon receiving a particular key input from the user input unit 150. A user may input a particular depth value of 20% through the second sub tool UI 311 as a depth value, while depth information has the range of 0 to 100%. A lower percentage may provide the 3D effect as if an object is far from a user, and a higher percentage may provide the 3D effect as if the object is close to a user. The depth information generator 120 may generate fourth depth information for the partitioned second area 321 based on the user's input. The second sub tool UI 313 may be used to adjust the third depth information of the second area 323.

C. Example 3 of Tool UI

Figure 4:
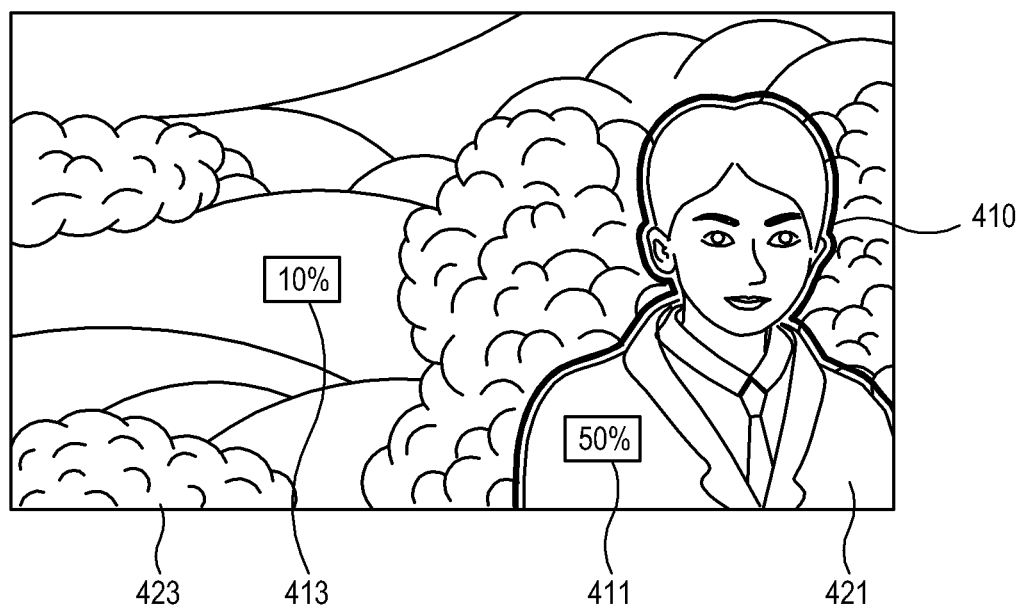

FIG. 4 illustrates a tool UI which includes a second tool UI shaped like a line. While FIG. 3 illustrates a tool UI including a second tool UI shaped like a straight line, FIG. 4 illustrates a second tool UI shaped like a curved line.

As shown in FIG. 4, a user may input a curved line on a frame through the second tool UI 410. Accordingly, a user may use the second tool UI shaped like a curved line in partitioning the object.

If the second tool UI 410 shaped like a curved line is input to a frame through the user input unit 150, the depth information generator 120 extracts location and color information of the second tool UI 410 on the frame displayed on the display unit 130, and partitions the frame into a plurality of second areas 421 and 423 based on the location information of the curved line.

Similarly to what is described above, the depth information generator 120 may determine the characteristic of the second areas 321 and 323 such as a sky, sea, wall, field, mountain or object, from the extracted location information and color information. The depth information generator 120 may determine that the second area 421 is an object based on the location and color information of the second area 421, and may automatically generate preset third depth information if the second area 421 is an object. Otherwise, the depth information generator 120 may determine that the second area 423 is a mountain from the location and color information of the second area 423, and may automatically generate preset third depth information if the second area 423 is a mountain.

The second tool UI further includes a second sub tool UI to adjust the third depth information. Second sub tool UIs 411 and 413 are generated and displayed upon receiving a particular key input from the user input unit 150. A user may input a particular depth value of 50% through the second sub tool UI 411 as a depth value. The depth information generator 120 may generate fourth depth information for the partitioned second area 421 based on the user's input. The second sub tool UI 413 may be used to adjust the third depth information of the second area 423.

D. Example 4 of Tool UI

Figure 5:
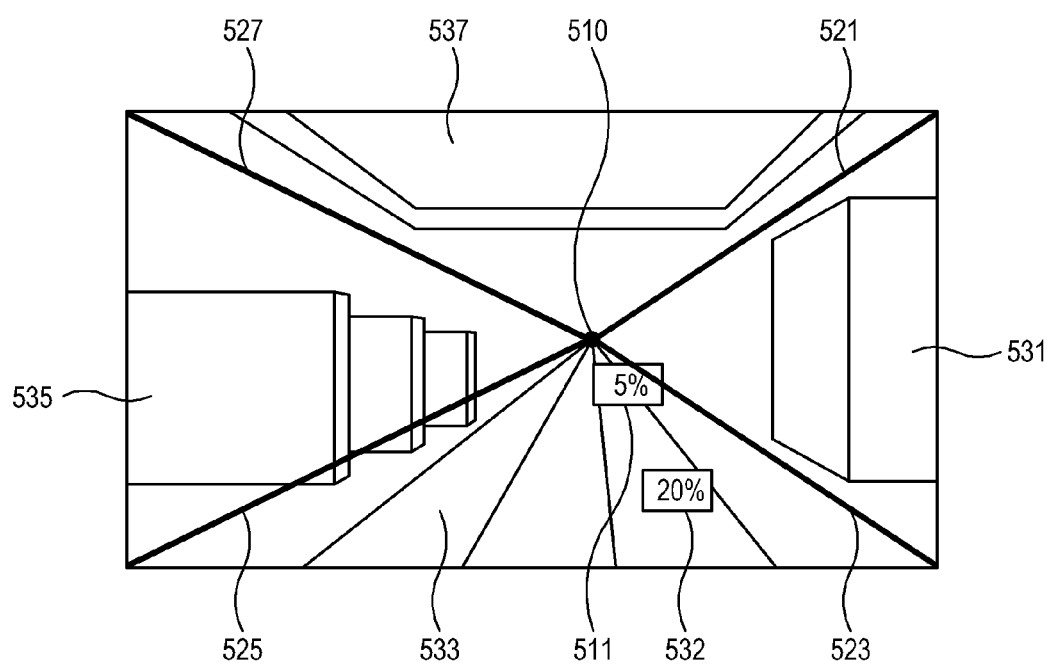
FIG. 5 illustrates an example of simultaneously using the first and second tool UIs generated by the depth information generator according to an exemplary embodiment of the apparatus for generating depth information of FIG. 1.

FIG. 5 illustrates an example of the case where the first and second tool UIs are used together.

If guide information is input through a first tool UI 510 and second tool UIs 521, 523, 525 and 527, wherein the first tool UI 510 is shaped like a dot in a location of a frame displayed on the display unit 130, through the user input unit 150, the depth information generator 120 determines that the first and second tool UIs 510, 521, 523, 525 and 527 are used to express perspective of the frame.

The depth information generator 120 may extract location information of the first tool UI 510 and second tool UIs 521, 523, 525 and 527, partition the frame into a plurality of third areas 531, 533, 535 and 537 based on the first tool UI 510 and second tool UIs 521, 523, 525 and 527, and automatically generate preset fifth depth information which has a depth value to create an effect where the third area that is close to the location of the first tool UI appears to be far from a user, and the third area that is far from the location of the first tool UI 510 appears to be close to a user, for the plurality of third areas 531, 533, 535 and 537. Then, the location of the first tool UI 510 becomes a vanishing point, and perspective from the edge of the frame to the vanishing point is generated.

Upon receiving a particular key input from the user input unit 150, first and second sub tool UIs 511 and 532 are generated and displayed. If a user inputs 5% as depth information through the first sub tool UI 511 and inputs 20% as depth information through the second sub tool UI 532, the depth information generator 120 may generate fifth depth information having perspective which gradually decreases from 20% to 5% from the edge of the frame to the first tool UI 510. If the partitioned first area, second area and third area overlap each other, the depth information generator 120 may generate single depth information by combining the depth information generated for each overlapping area.

The above-described process of partitioning the frame into a plurality of third areas through the first tool UI 510 and second tool UIs 521, 523, 525 and 527 may be omitted. In this case, the depth information generator 120 may automatically generate preset fifth depth information having the depth values to create an effect where the area that is close to the location corresponding to a user's input through the first tool UI 510 appears to be far from a user and the area that is far from the location corresponding to a user's input through the first tool UI 510 appears to be close to a user, for the entire area of the frame. That is, if a user's input is received through the first tool UI 510 after the reception of the particular key input from the user input unit 150, the depth information generator 120 may automatically generate predetermined fifth depth information having the depth values so that the area that is close to the location corresponding to a user's input through the first tool UI 510 appears to be far from a user and the area that is far from the location corresponding to a user's input through the first tool UI 510 appears to be close to a user, for the entire area of the frame.

The operation of the depth information generator 120 according to another exemplary embodiment is described in more detail with reference to FIGS. 6 to 14.

The depth information generator 120 according to another exemplary embodiment may partition an object, to which depth information is allotted in the frame, according to a generally known object allotment algorithm or method, and generate depth information corresponding to guide information for the partitioned object if the guide information is input through a tool UI to a predetermined location within the partitioned object. The guide information may be input a number of times through the tool UI to a plurality of locations within the object, and the depth information generator 120 may generate depth information based on the plurality of pieces of the input guide information for the object.

The depth information generator 120 according to the current exemplary embodiment may generate preset depth information with respect to the entire partitioned object, and control the UI generator 140 to generate and display a UI to adjust the preset depth information for the entire object.

E. Example 5 of Tool UI

A tool UI according to an exemplary embodiment includes a first tool UI which occupies a first area and has a predetermined shape with a vertex.

Figure 6A:
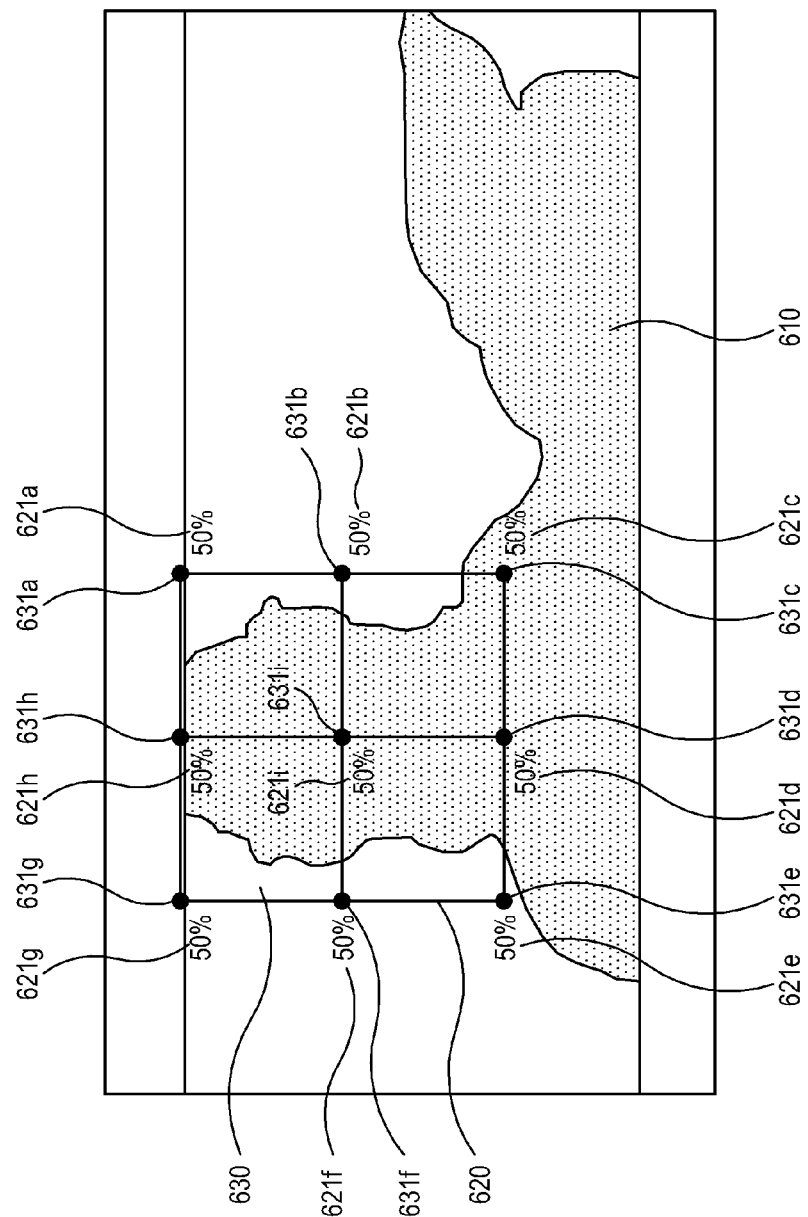
FIGS. 6A to 6D illustrate an example of a first tool UI generated by a depth information generator according to an exemplary embodiment of the apparatus for generating depth information of FIG. 1.

As shown in FIG. 6A, the depth information generator 120 partitions an object 610 in a frame displayed on the display unit 130, and a plurality of tool UIs is displayed together on the display unit 130 if a particular key input is received through the user input unit 150. A user selects and places a first tool UI 620 in a desired location among a plurality of displayed tool UI. For example, the first tool UI 620 may include a template which occupies a first area and includes a vertex, such as a triangle, rectangle or polygon, and a user may select the first tool UI 620 having a template that is similar to the shape of the partitioned object. FIG. 6A illustrates an example of a first tool UI 620 which is shaped like a square having a first area 630 including nine vertexes 631a, 631b, 631c, 631d, 631e, 631f, 631g, 631h, and 631i. The first tool UI 620 includes first sub tool UIs 621a, 621b, 621c, 621d, 621e, 621f, 621g, 621h, and 621i to display and adjust preset depth information. The first sub tool UIs 621a to 621i are located in the vertexes and displayed in the same number as the vertexes 631a to 631i. Accordingly, FIG. 6A illustrates nine first sub tool UIs 621a to 621i which display the preset depth information of 50% on the nine vertexes 631a to 631i.

Figure 6B:
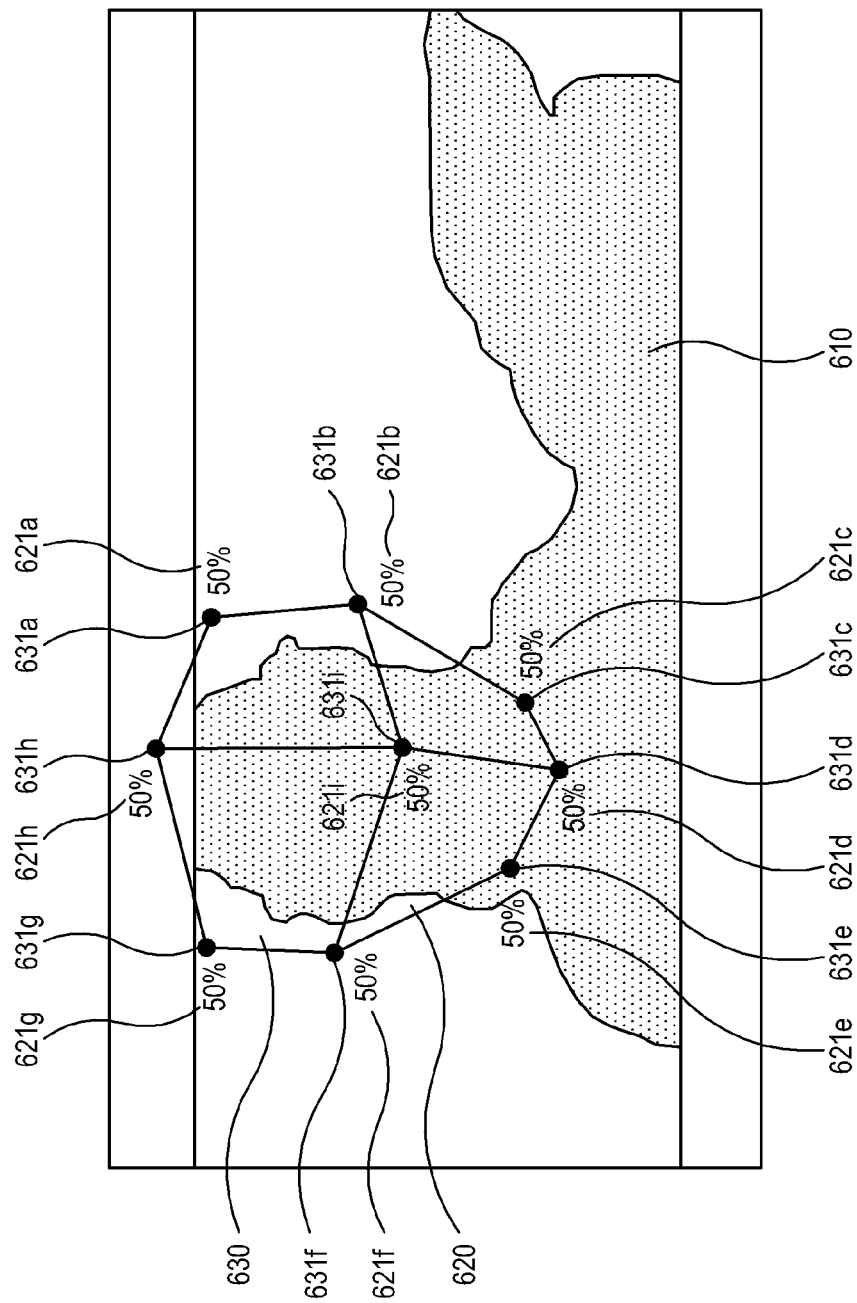

The first tool UI may be used to adjust at least one of a size and a location of the first area 630 by adjusting the location of the vertexes 631a to 631i through the user input unit 150. As shown in FIG. 6B, the location of the nine vertexes 631a to 631i of the first tool UI may be adjusted through the user input unit 150. A user adjusts the location of the vertexes 631a to 631i in consideration of the shape of the partitioned object to adjust the size and location of the first area 630.

Figure 6C:
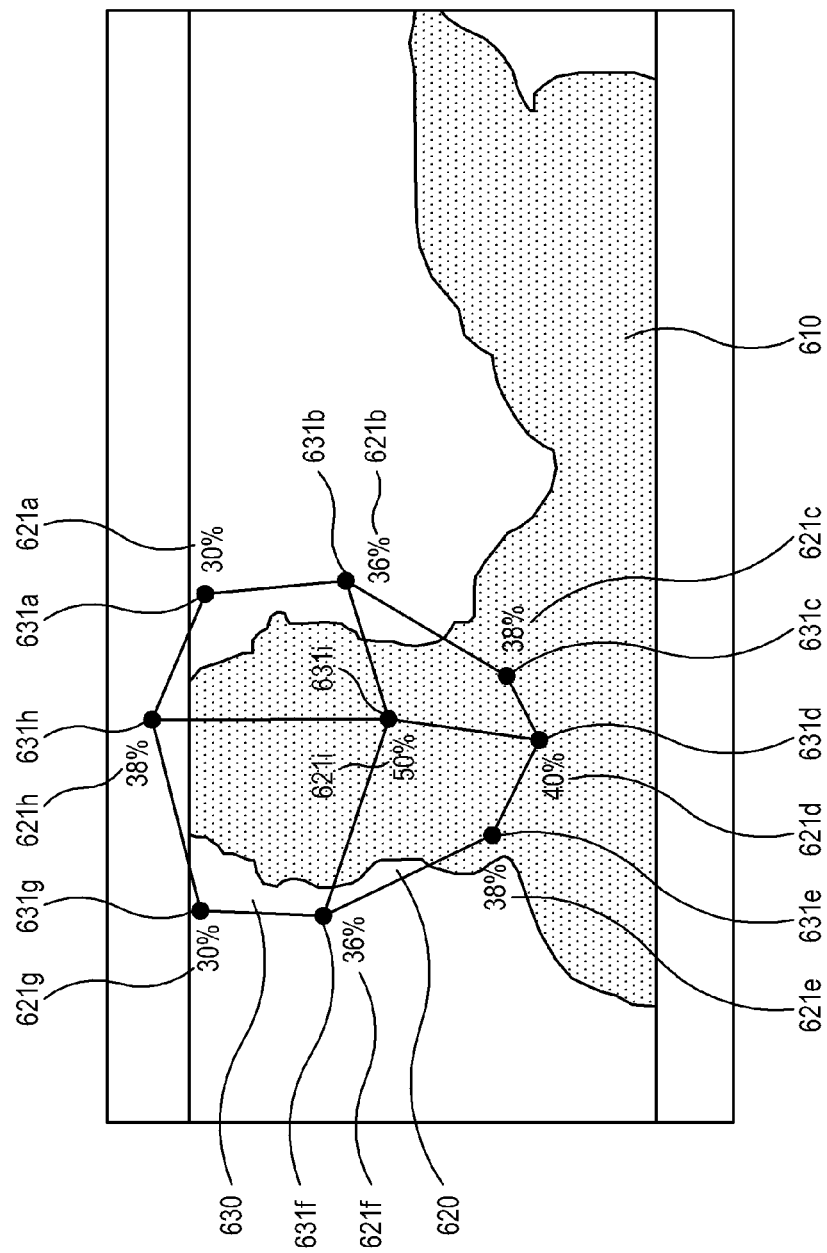

Preset depth information of the first sub tool UIs 621a to 621i may be adjusted through the user input unit 150. FIG. 6A illustrates nine first sub tool UIs 621a to 621i in which a depth value 50% set as a default is displayed. A user may select at least one of the first sub tool UIs 621a to 621i through the user input unit 150 and input a desired depth value. A user may input different values through the nine first sub tool UIs 621a to 621i. For example, if a depth value that is input through the first sub tool UI 621i is 50% and a depth value that is input through the first sub tool UI 621d is 40%, as shown in FIG. 6C, the area between the two vertexes 631i and 631d may have a depth value that gradually decreases from 50% to 40%. This also applies to the case where a plurality of second sub tool UIs included in the second tool UI is input.

Accordingly, the depth information generator 120 may generate first depth information having the depth value input through the first sub tool UIs 621a to 621i with respect to the first area 630 that is adjusted by adjusting the location of the vertex of the first tool UI.

Figure 6D:
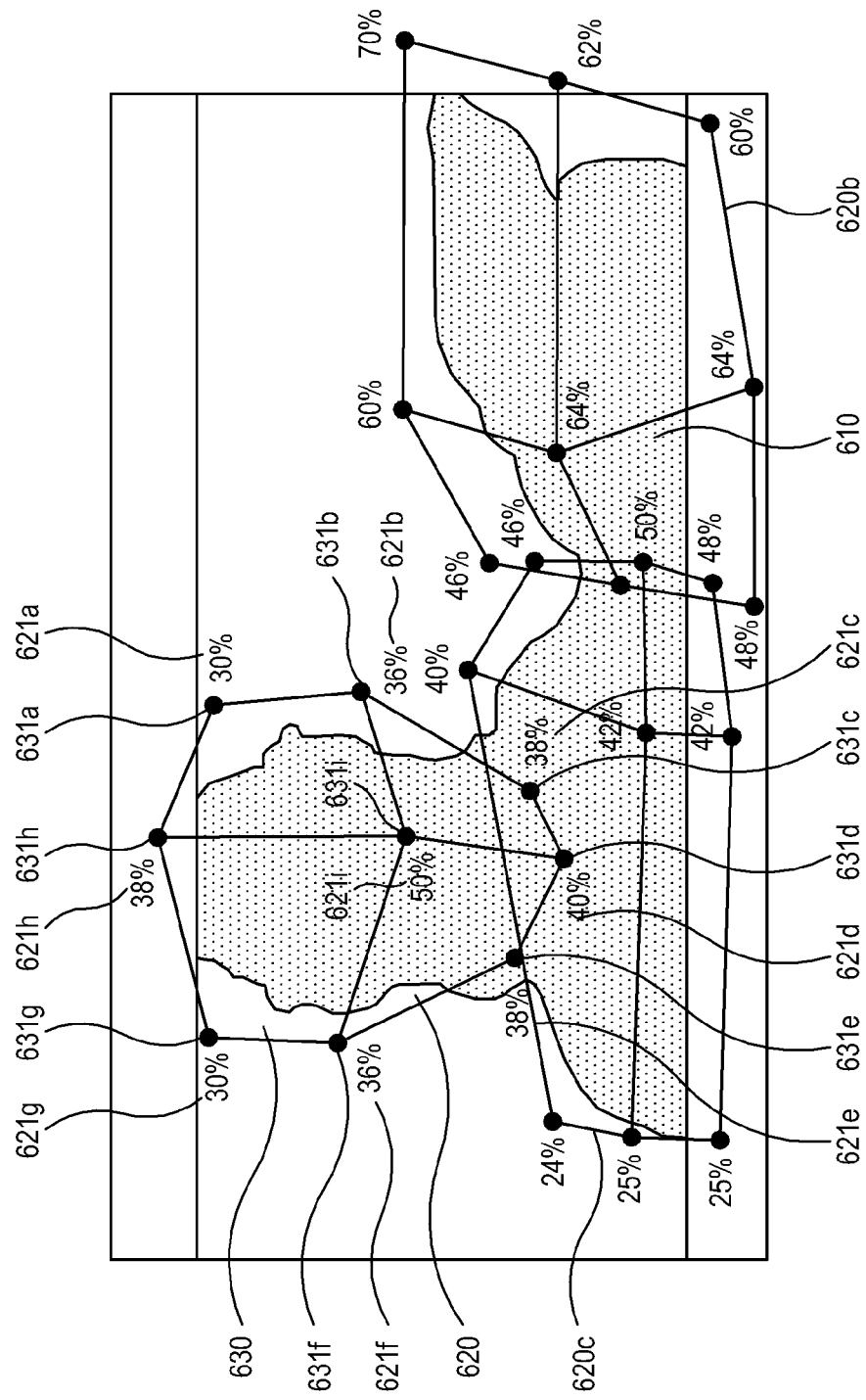

As shown in FIG. 6D, a plurality of first tool UIs 620a, 620b and 620c may apply to partition a single object, and the depth information generator 120 may generate first depth information with respect to the object based on guide information input through the plurality of first tool UIs 620a, 620b and 620c.

As a result, a user may set depth information to provide fine 3D effect to a single object with a simple manipulation.

F. Example 6 of Tool UI

A tool UI according to an exemplary embodiment includes a second tool UI shaped like a dot. The present exemplary embodiment is useful in allotting depth information having a particular value with respect to an entire partitioned object 610 and adjusting depth information of a particular part of the object 610.

Figure 7:
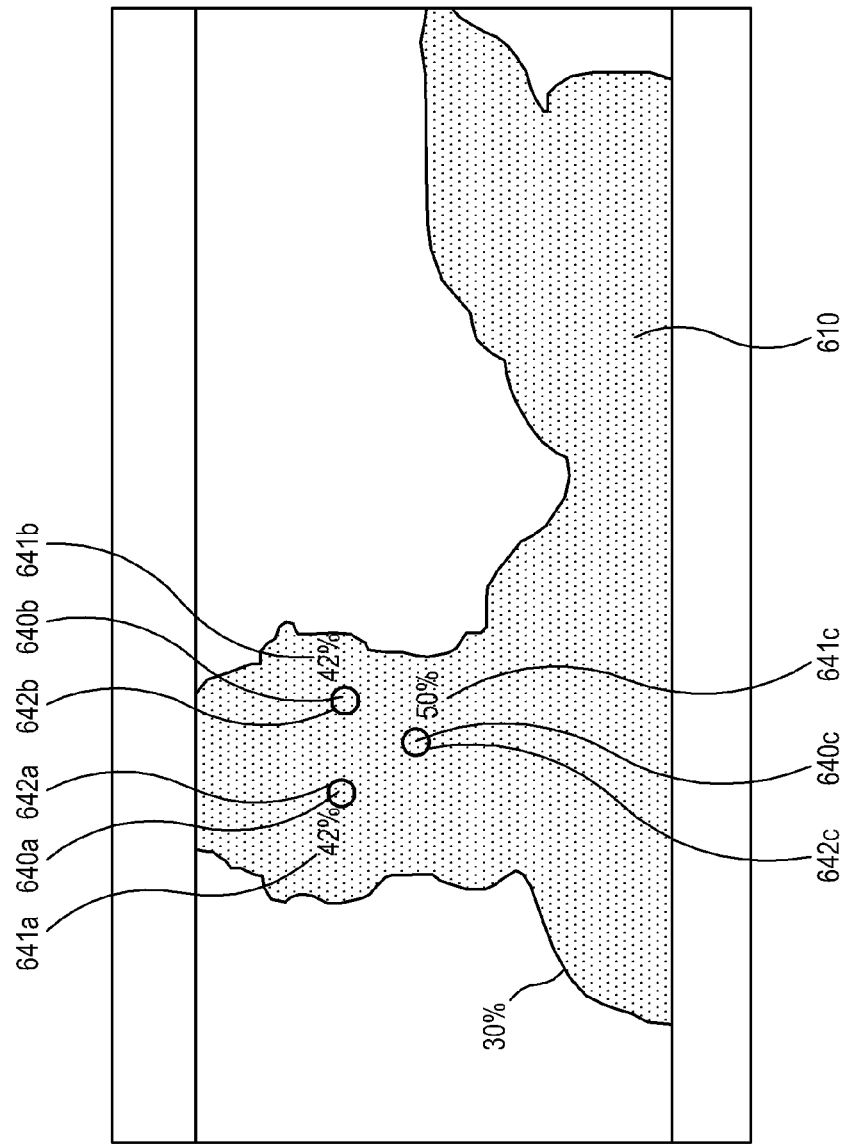
FIGS. 7 to 11B illustrate an example of a second tool UI generated by the depth information generator according to an exemplary embodiment of the apparatus for generating depth information of FIG. 1.

As shown in FIG. 7, if depth information of 30% is allotted to the entire partitioned object 610, and depth information of only a particular location in the partitioned object 610 is changed, a user selects the second tool UIs 640a, 640b, and 640c through the user input unit 150 and places the second tool UIs 640a to 640c in a desired location. The second tool UIs may be used to input information a number of times.

The second tool UIs 640a to 640c include second sub tool UIs 641a, 641b, and 641c which are used to display and adjust preset depth information. As shown in FIG. 7, if preset depth information of the second sub tool UIs 641a to 641c is, 50%, a user may select at least one of the second sub tool UIs 641a and 641b through the user input unit 150 and adjust the depth information to 42%.

If the second tool UIs 640a to 640c are input, the depth information generator 120 may extract location information of the second tool UIs 640a to 640c, partition preset second areas 642a, 642b, and 642c into a predetermined size centering on the second tool UIs 640a to 640c, and generate second depth information based on a user's input received through the second sub tool UIs 641a to 641c with respect to the second areas 642a to 642c.

Accordingly, depth information according to the user's input received through the second sub tool UIs 641a to 641c is generated for the second areas 642a to 642c partitioned by the second tool UIs, and depth information which is set for the entire object is generated for the object excluding the second areas 642a to 642c.

G. Example 7 of Tool UI

The difference of the tool UI according to the current exemplary embodiment from the tool UI in FIG. 7 is that the size of the second areas partitioned by the second tool UIs may be adjusted.

Figure 8:
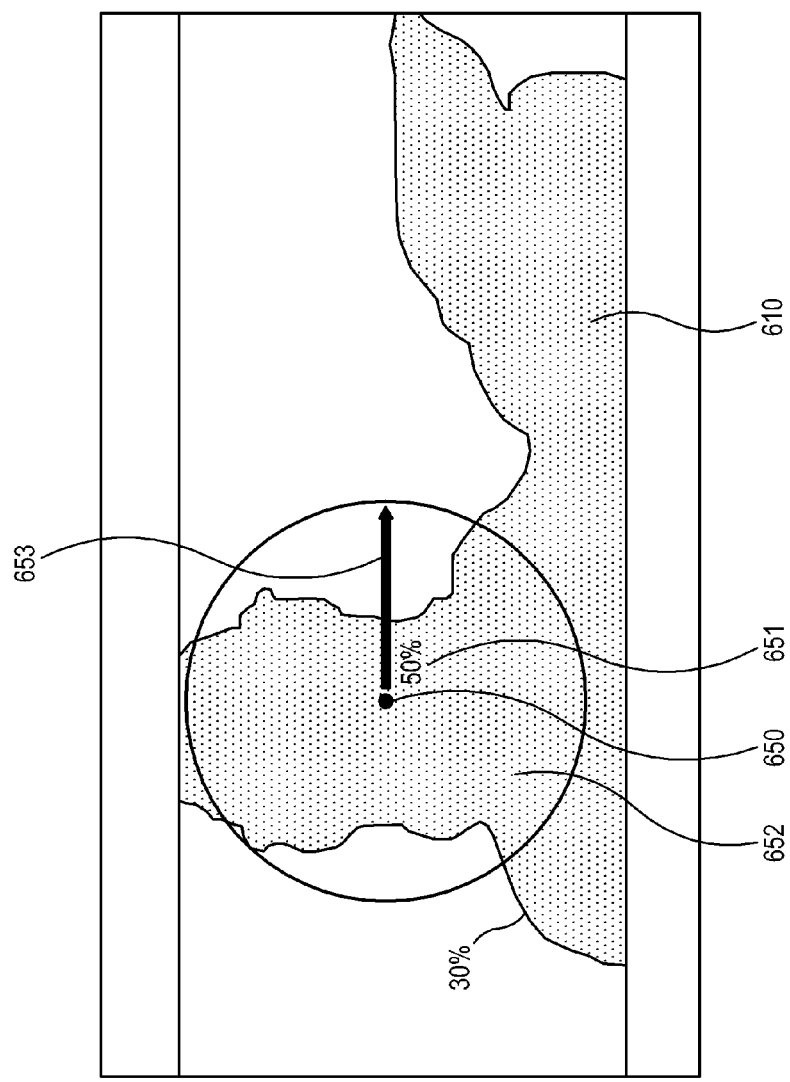

As shown in FIG. 8, if depth information of 30% is allotted to the entire partitioned object 610 and depth information of only a particular location of the partitioned object 610 is changed, a user selects a second tool UI 650 through the user input unit 150 and places the second tool UI 650 in a desired location. Like in FIG. 7, the second tool UI 650 includes a second sub tool UI 651 which is used to display and adjust preset depth information. If the second tool UI 650 is input, the depth information generator 120 extracts location information of the second tool UI 650 and partitions a preset second area 652 into a predetermined size centering on the second tool UI 650. If a particular key input is received through the user input unit 150, a third sub tool UI 653 is generated and displayed to adjust the size of the second area 652. Then, a user adjusts the size of the second area 652 through the third sub tool UI 653, and the depth information generator 120 generates second depth information having a depth value input through the second sub tool UI 651 with respect to the second area 652 adjusted through the third sub tool UI 653. Like in FIG. 7, the depth information generator 120 may generate depth information to allot a depth value of 30% to the entire object 610 and allot a depth value of 50% input through the second sub tool UI 651 to the second area 652 adjusted through the third sub tool UI 653.

H. Example 8 of Tool UI

The difference of a tool UI according to the current exemplary embodiment from the tool UI in FIG. 8 is that a degree of a curve of a depth value of depth information applying to a second area may be adjusted.

Figure 9:
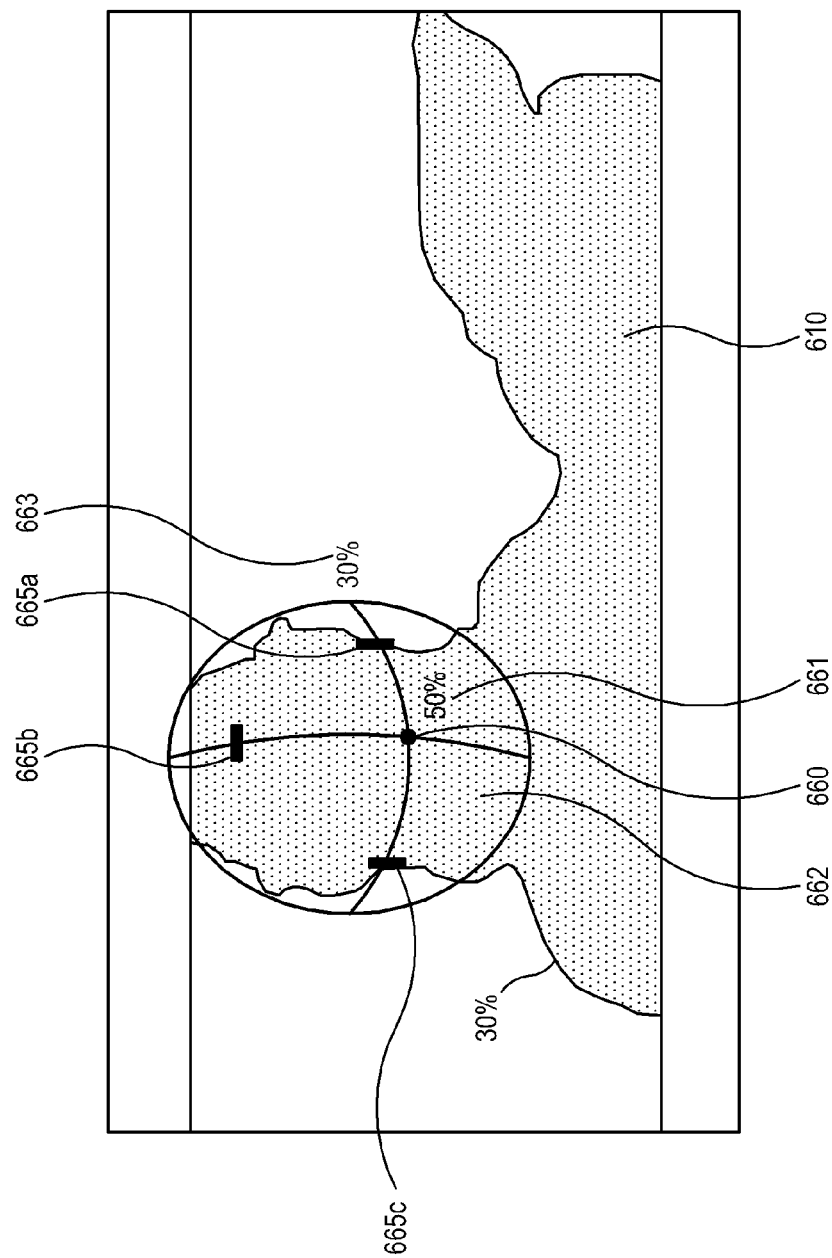

As shown in FIG. 9, if depth information of 30% is allotted to the entire partitioned object 610 and depth information of only a particular location of the partitioned object 610 is changed, a user selects a second tool UI 660 through the user input unit 150 and places the second tool UI 660 in a desired location. Like in FIG. 7, the second tool UI 660 includes a second sub tool UI 661 which is used to display and adjust preset depth information. Like in FIG. 8, the second tool UI 660 may include a third sub tool UI (not shown) to adjust a size of the second area 662. The second tool UI according to the current exemplary embodiment further includes a fourth sub tool UI 663 which is provided at an edge of the second area and used to input third depth information, and fifth sub tool UIs 665a, 665b, and 665c which are used to adjust the degree of curve of a depth value which gradually increases or decreases between the second and third depth information.

A user may input the second depth information of 50% through the second sub tool UI 661 displayed on the location of the second tool UI 660, input the third depth information of 30% through the fourth sub tool UI 663, and move the location of the fifth sub tool UIs 665a, 665b, and 665c from the location of the second tool UI 660 closer to an edge of an object.

Figure 10A:
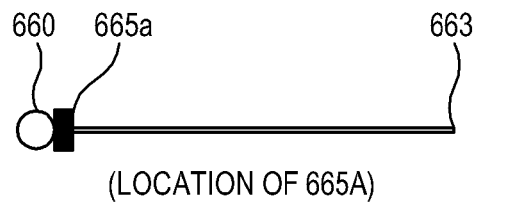
Figure 10B:
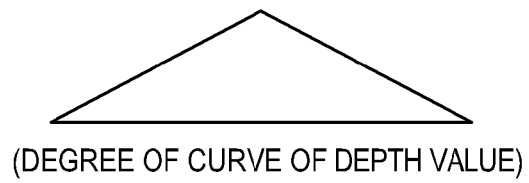
Figure 10C:
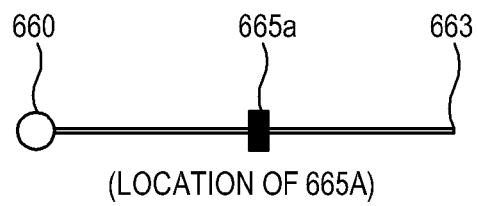
Figure 10D:
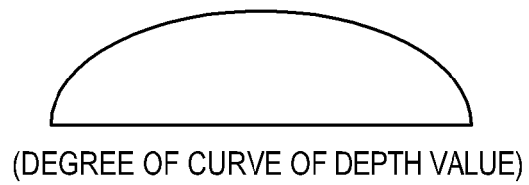
Figure 10E:
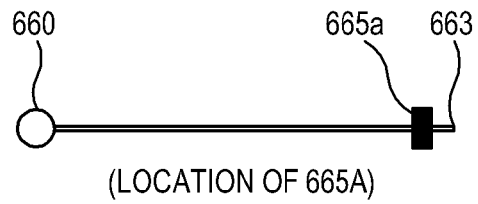
Figure 10F:
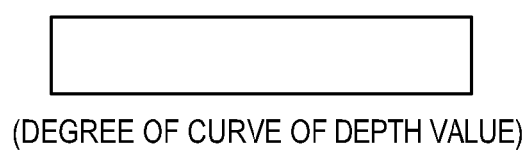

Referring to FIGS. 10A and 10B when the fifth sub tool UI 665a is closer to the location of the second tool UI 660, the degree of curve of the depth value may sharply increase and decrease from the second depth information (50%) to third depth information (30%) with respect to the partitioned second area. Referring to FIGS. 10C and 10D, if the fifth sub tool UI 665a is provided between the location of the second tool UI 660 and the edge, the degree of curve of the depth value may gradually increase and decrease from the second depth information (50%) to the third depth information (30%). Referring to FIGS. 10E and 10F when the fifth sub tool UI 665a is closer to the edge, an average value of the second depth information (50%) and the third depth information (30%) may apply uniformly to the degree of curve of the depth value.

The location of the second tool UI 660 according to the current exemplary embodiment may be adjusted within the second area. Then, a central axis of the degree of curve of the depth value may be moved.

I. Example 9 of Tool UI

The difference of a tool UI according to the current exemplary embodiment from the above-described second tool UI is that at least one of a rotation and inclination of the second area may be adjusted.

Figure 11A:
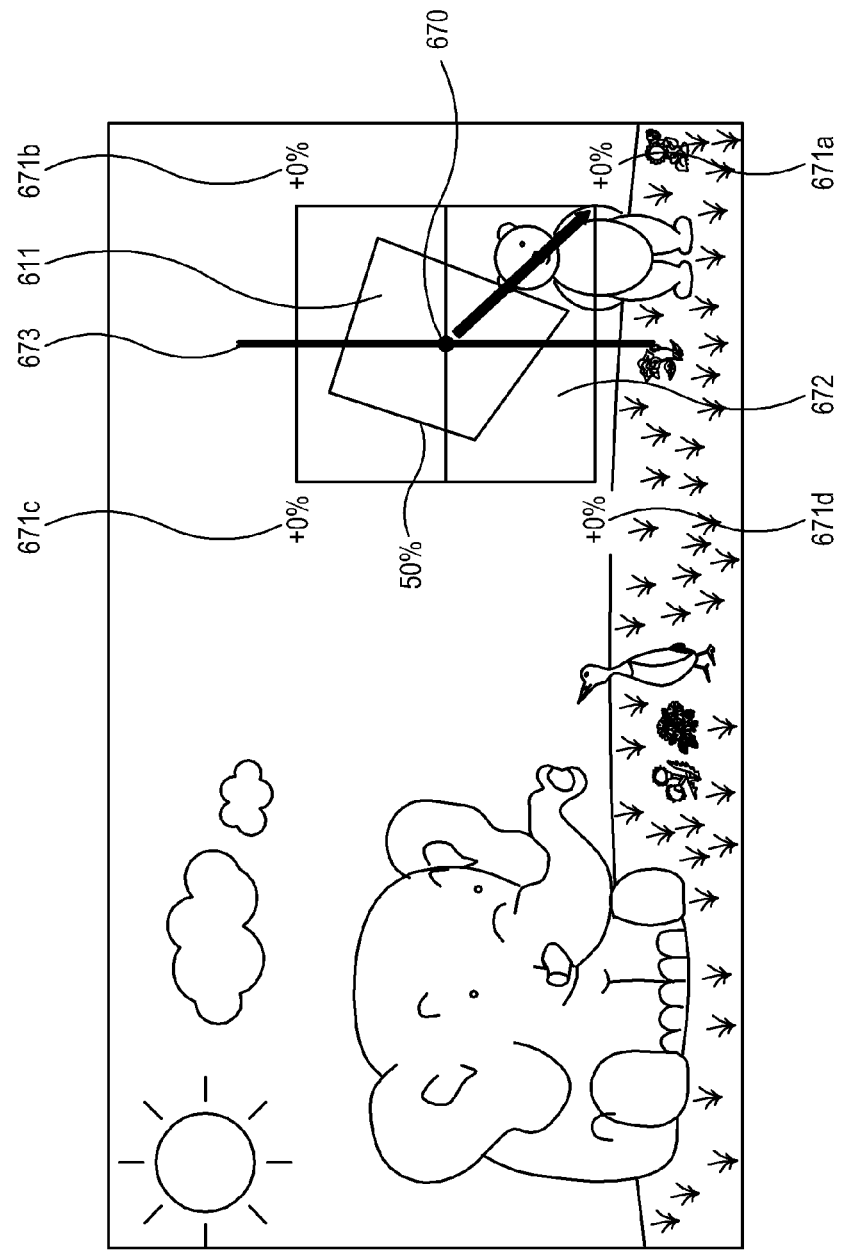

As shown in FIG. 11A, if depth information of 50% is allotted to the entire partitioned object 611 and depth information of only a particular location of the partitioned object 611 is changed, a user selects the second tool UI 670 through the user input unit 150 and places the second tool UI 670 in a desired location. Like in FIG. 7, the second tool UI 670 includes second sub tool UIs 671a, 671b, 671c, and 671d to display and adjust preset depth information, and may include a third sub tool UI (not shown) to adjust a size of the second area 672, like in FIG. 8. The second tool UI 670 according to the current exemplary embodiment further includes a sixth sub tool UI 673 which is used to adjust at least one of rotation and inclination of the second area centering on the location of the second tool UI 670. As shown in FIG. 11A, the second area 672 which has a predetermined size by selecting the second tool UI 670 may vary including a circular, triangular, rectangular or polygonal shape.

A user may rotate or adjust inclination of the second area 672 through the sixth sub tool UI 673 to make the second area 672 have almost the same shape as the partitioned object 611.

Figure 11B:
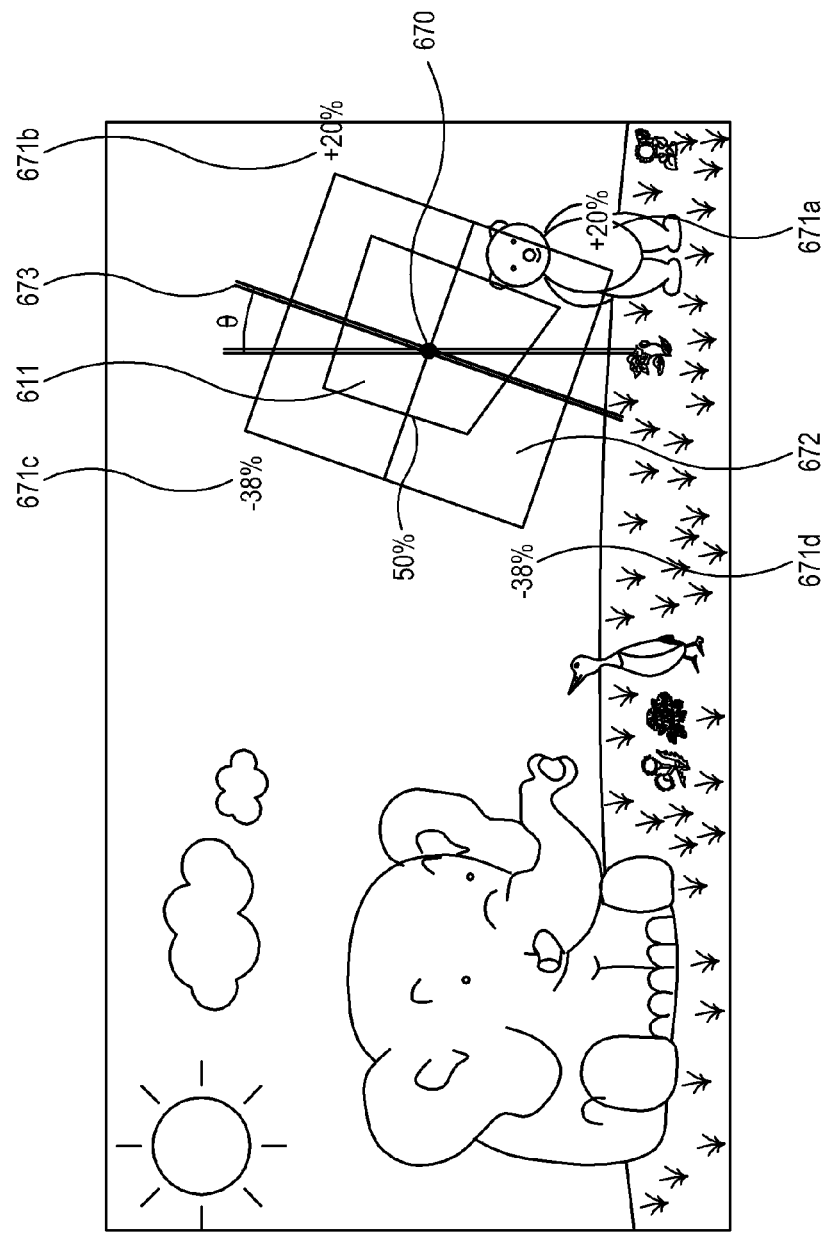

Referring to FIG. 11B, a user may adjust the inclination of the second area 672 by manipulating the sixth sub tool UI 673 to make the second area 672 inclined or rotated by an angle θ as compared to the sixth sub tool UI 673 illustrated in FIG. 11A. Accordingly, the depth information generator 120 may generate second depth information input through the second sub tool UI 671 with respect to the second area 672 that is inclined or rotated by the angle θ.

J. Example 10 of Tool UI

A tool UI according to the current exemplary embodiment may include a third tool UI which occupies a third area that has the width of the second area and the length of a plurality of connected second tool UIs by connecting the plurality of second tool UIs.

Figure 12:
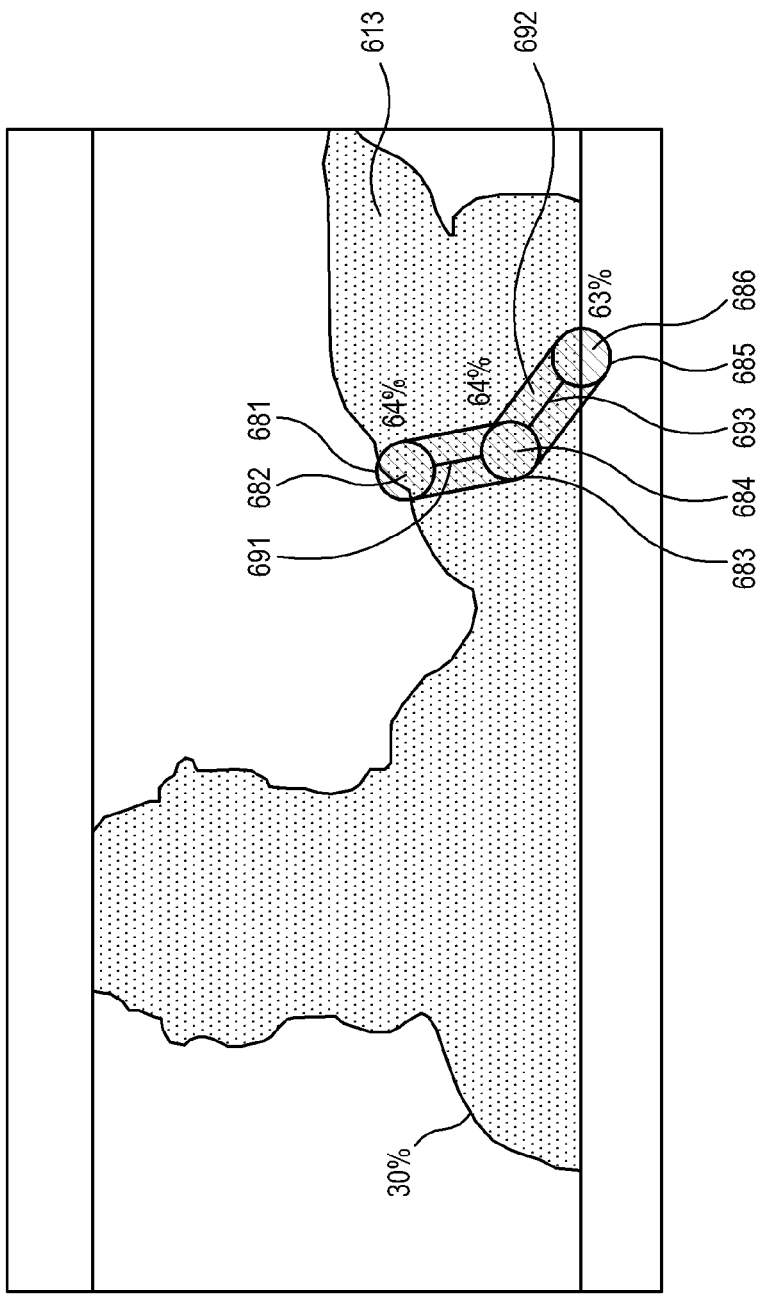
FIG. 12 illustrates an example of a third tool UI generated by the depth information generator according to an exemplary embodiment of the apparatus for generating depth information of FIG. 1.

Referring to FIG. 12, a user may input a plurality of second tool UIs 681, 683 and 685 with respect to the partitioned object 613, through the user input unit 150. A user may adjust a size of second areas 682, 684 and 686 through a third sub tool UI (not shown) to adjust the size of the second area having a preset size according to the second tool UI.

Third tool UIs 691 and 693 are shaped like a line, and may connect the plurality of second tool UIs 681, 683 and 685. If the third tool UIs 691 and 693 are selected by a particular key input through the user input unit 150 to connect the plurality of second tool UIs 681, 683 and 685, the depth information generator 120 partitions the third area 692 that has the width of the second areas 682, 684 and 686 and the length of the connected second tool UIs 681, 683 and 685. The depth information generator 120 may generate second depth information input through the second sub tool UI (not shown) with respect to the partitioned third area.

K. Example 11 of Tool UI

The depth information generator 120 may partition an object 710 on a frame. Referring to FIG. 13, a user may select a plurality of second tool UIs 710a, 710b, 710c and 710d and a plurality of fourth tool UIs 720a, 720b, and 720c connecting the plurality of second tool UIs 710a to 710d through the user input unit 150.

The depth information generator 120 may extract location information of the plurality of second tool UIs 710a to 710d and the plurality of fourth tool UIs 720a to 720c, and partition the object 710 into a plurality of fourth areas 722a, 722b, and 722c based on the second tool UIs 710a to 710d and fourth tool UIs 720a to 720c.

The depth information generator 120 may generate second depth information that is input by the second sub tool UIs 711a, 711b, 711c, and 711d with respect to the plurality of fourth areas 722a to 722c. As described above, a user may input depth information having different sizes to the plurality of second sub tool UIs 711a to 711d.

L. Example 12 of Tool UI

A tool UI according to the current exemplary embodiment may be useful where there is an overlapping area for an object partitioned by the depth information generator 120.

As shown in FIG. 14A, a partitioned object 810 includes overlapping areas 811a and 811b.

As shown in FIG. 14B, a user may input a plurality of second tool UIs 821, 823 and 825 to the overlapping area 811b through the user input unit 150, and input second depth information through the second sub tool UIs 822, 824 and 826. A user may input a plurality of fifth tool UIs 831, 833 and 835 which connects the plurality of second tool UIs 821, 823 and 825. The depth information generator 120 may extract location information of the input second sub tool UIs 822, 824 and 826 and fifth UIs 831, 833 and 835, and partition a fifth area 832 which is formed by connecting the second sub tool UIs 822, 824 and 826 and fifth tool UIs 831, 833 and 835 within the partitioned object 810. The depth information generator 120 may generate second depth information input through the second sub tool UIs 822, 824 and 826 with respect to the fifth area 832.

Accordingly, a user may set depth information of 50% to the partitioned object 810 and set depth information of 60% to the fifth area 832 to display the fifth area 832 as the overlapping area closer to a user.

The fifth tool UI is shaped like a line and may include one of a solid line and a dotted line. Referring to FIG. 14B, in the case of fifth tool UIs 831 and 833 having a solid line, a depth value of 60% applies to the fifth area and a depth value of 50% applies to remaining areas based on the fifth tool UIs 831 and 833. In the case of a fifth tool UI 835 having a dotted line, a depth value may gradually increase from 50% to 60%.

Figure 15:
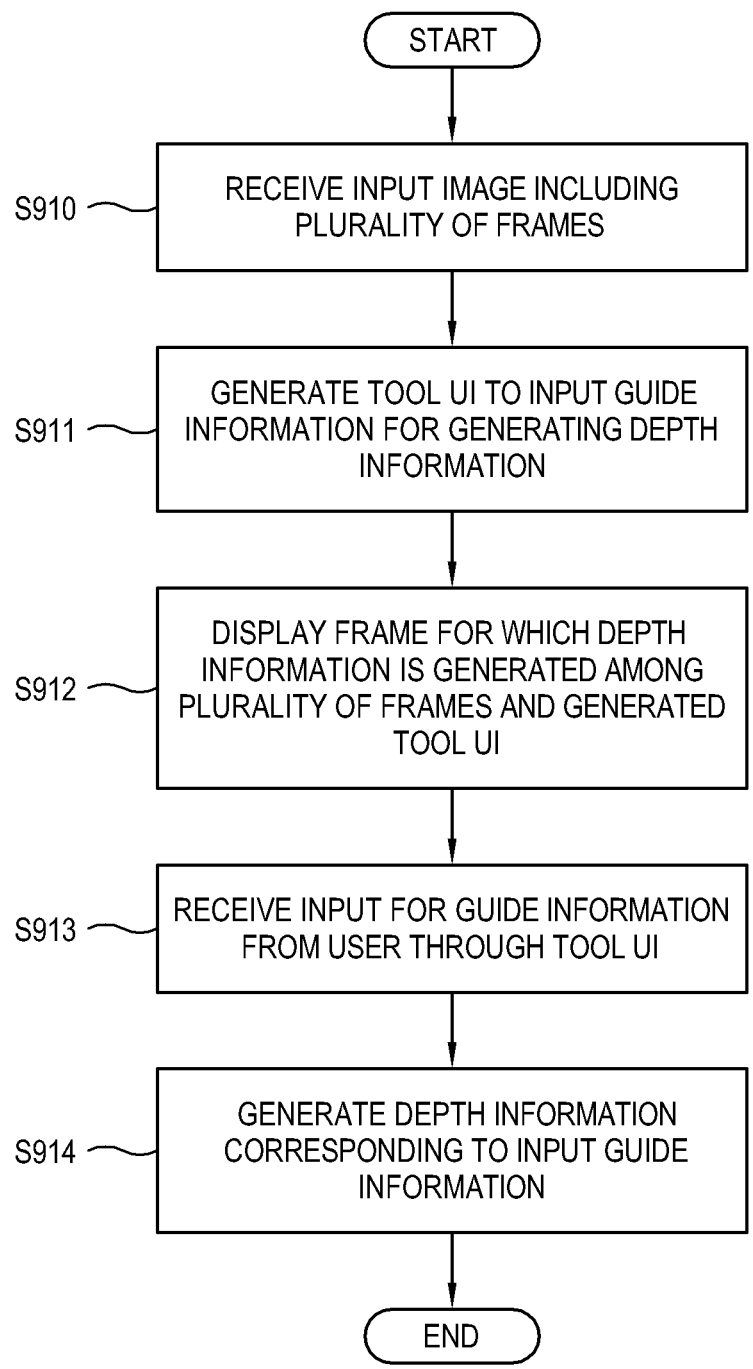
FIG. 15 is a control flowchart of the depth information generator according to an exemplary embodiment of the apparatus for generating depth information of FIG. 1.

FIG. 15 is a control flowchart of the apparatus for generating depth information 100 including the depth information generator 120 according to an exemplary embodiment.

As shown therein, the method for generating depth information includes receiving a 2D image signal including a plurality of frames (S910); generating a tool UI which is used to input guide information for generating depth information (S911); displaying a frame for which depth information is generated among the plurality of frames, and the generated tool UI (S912); receiving a user's input for guide information through the displayed tool UI (S913); and generating depth information corresponding to the input guide information (S914). Detailed control operations are described above with respect to FIGS. 1 to 4.

Figure 16:
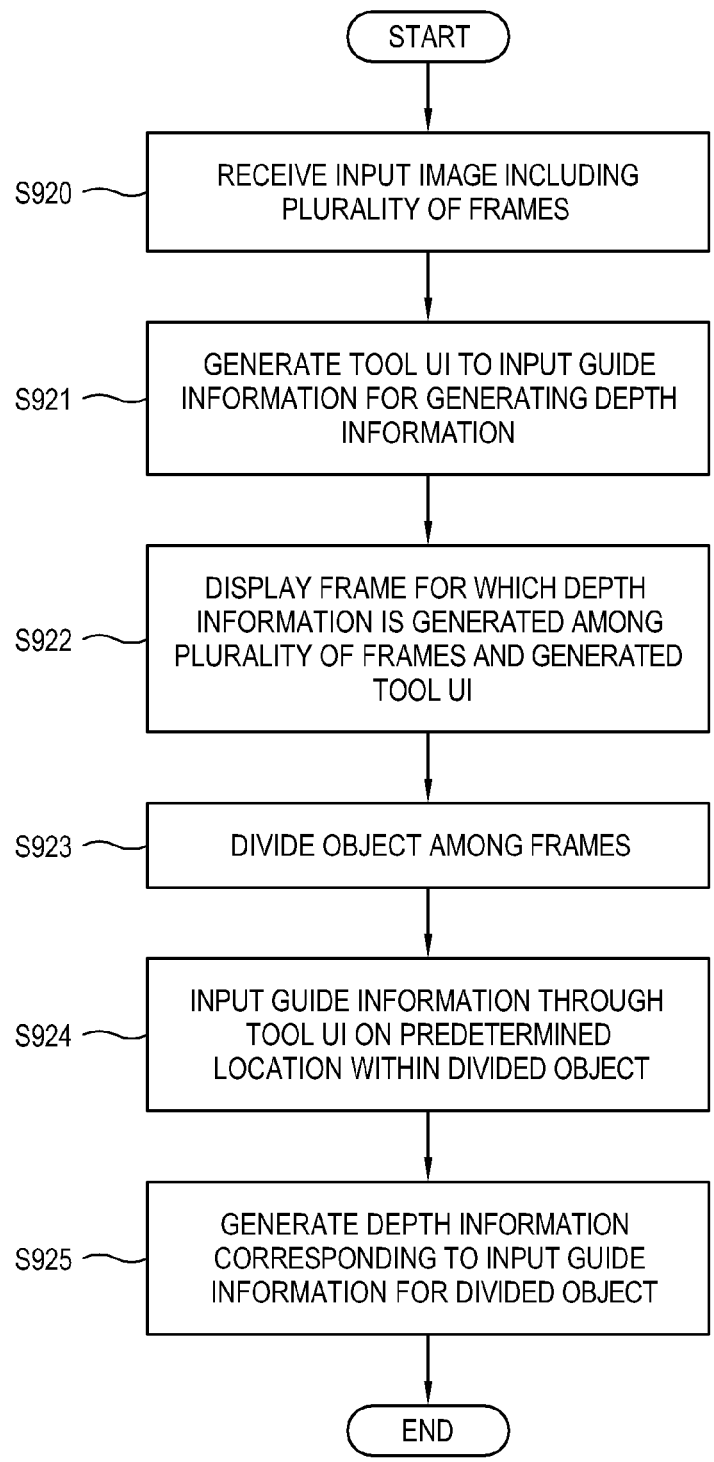
FIG. 16 is a control flowchart of the depth information generator according to an exemplary embodiment of the apparatus for generating depth information of FIG. 1.

FIG. 16 is a control flowchart of the apparatus for generating depth information 100 including the depth information generator 120 according to another exemplary embodiment.

As shown therein, the method for generating depth information includes receiving a 2D image signal including a plurality of frames (S920); generating a tool UI which is used to input guide information for generating depth information (S921); displaying a frame for which depth information is generated among the plurality of frames, and the generated tool UI (S922); partitioning the object among the displayed frames (S923); inputting guide information through the tool UI to a predetermined location within the partitioned object (S924); and generating depth information corresponding to the input guide information for the partitioned object (S925). Detailed control operations are described above with respect to FIGS. 5 to 14.

The method for generating depth information by the apparatus for generating depth information 100 according to exemplary embodiments may be realized as a program instruction which is executed by various computer means and recorded in a computer-readable storage medium. The computer-readable storage medium may include a program instruction, a data file and a data configuration solely or collectively. The program instruction which is recorded in the storage medium may be specifically designed and configured for exemplary embodiments or known to the skilled in computer software and available. For example, the computer-readable storage medium includes magnetic media such as a hard disk, floppy disk and magnetic tape, optical media such as CD-ROM or DVD, magneto-optical medium such as a floptical disk and hardware devices which are specifically configured to store and execute a program instruction such as ROM, RAM and flash memory. The program instruction may include an advanced language code which is executed by a computer by using an interpreter and/or a machine code generated by a compiler. The hardware device may be configured to operate as at least one software module to perform the operations according to exemplary embodiments, and vice versa.

As described above, an apparatus and method for generating depth information which includes a tool for generating depth information to generate depth information by taking less time and by a cost-efficient method, and a computer-readable storage medium thereof which is encoded by an instruction that is executed by a computer according to the method thereof.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus for generating depth information comprising:
   a receiver which receives a two-dimensional (2D) image signal comprising a plurality of frames;
   a user interface (UI) generator which generates a tool UI to input guide information for generating depth information;
   a display unit which displays a frame, for which depth information is generated, among the plurality of frames, and the generated tool UI; and
   a depth information generator which generates depth information corresponding to the guide information input by a user input through the tool UI,
   wherein the guide information, which is input through the tool UI, is input via at least one of a dot, a line, and a diagram on the frame displayed on the display unit, and
   wherein the depth information generator extracts location and color information of the tool UI on the frame and partitions the frame as a plurality of areas based on the location and color information.

2. The apparatus according to claim 1, wherein the guide information is input a number of times through the tool UI, and
   the depth information generator generates depth information based on a plurality of pieces of the input guide information.

3. The apparatus according to claim 1, wherein the tool UI comprises a first tool UI which is shaped like a dot, and
   the depth information generator extracts location and color information of the first tool UI on the frame and partitions a first area having color information within a predetermined range based on the extracted color information in a location of the frame designated through the first tool UI.

4. The apparatus according to claim 3, wherein the depth information generator automatically generates preset first depth information corresponding to the first tool UI for the partitioned first area.

5. The apparatus according to claim 4, wherein the first tool UI comprises a first sub tool UI to adjust the preset first depth information, and
   the depth information generator generates second depth information based on a user's input that is input through the first sub tool UI for the partitioned first area.

6. The apparatus according to claim 3, wherein the tool UI further comprises a second tool UI which is shaped like a line or diagram, and the depth information generator extracts location information of the second tool UI on the frame, and partitions the frame into a plurality of second areas based on the extracted location information.

7. The apparatus according to claim 6, wherein the depth information generator automatically generates preset third depth information corresponding to the second tool UI for the plurality of second areas.

8. The apparatus according to claim 7, wherein the second tool UI further comprises a second sub tool UI to adjust the preset third depth information, and
   the depth information generator generates fourth depth information based on a user's input that is input through the second sub tool UI for at least one of the plurality of second areas.

9. The apparatus according to claim 6, wherein a plurality of user's inputs is input through the first and second tool UI, and
   the depth information generator partitions the frame into a plurality of third areas based on a user's input through the second tool UI, and automatically generates preset fifth depth information having a first depth value to create an effect that at least one of the plurality of the third areas which is disposed close to a location corresponding to a user's input through the first tool UI appears to be far from a user, and having a second depth value to create an effect that another one of the plurality of the third areas which is disposed further away from the location corresponding to the user's input through the first tool UI appears to be closer to the user.

10. The apparatus according to claim 9, wherein, when partitioning the frame into the third areas through the first and second tool UI is omitted,
    the depth information generator automatically generates the preset fifth depth information, for the entire frame, having the first depth value to create the effect that an area disposed closer to the location corresponding to the user's input through the first tool UI appears to be further away from the user and having the second depth value to create the effect that an area disposed further away from the location corresponding to the user's input through the first tool UI appears to be closer to the user.

11. The apparatus according to claim 9, wherein the partitioned first, second and third areas overlap each other, and
    the depth information generator generates single depth information by combining the depth information generated for each of overlapping areas.

12. A method for generating depth information comprising:
    receiving a two-dimensional (2D) image signal comprising a plurality of frames;
    generating a tool user interface (UI) which is used to input guide information for generating depth information;
    displaying a frame for which depth information is generated among the plurality of frames, and the generated tool UI;
    receiving input for guide information from a user through the displayed tool UI; and
    generating depth information corresponding to the input guide information,
    wherein the guide information, which is input through the tool UI, is input via at least one of a dot, a line, and a diagram on the frame displayed on the display unit, and
    wherein the generating the depth information includes extracting location and color information of the tool UI on the frame and partitioning the frame as a plurality of areas based on the location and color information.

13. The method according to claim 12, wherein the guide information is input a number of times through the tool UI, and
the generating the depth information comprises generating depth information based on a plurality of pieces of the input guide information.

14. The method according to claim 12, wherein the tool UI comprises a first tool UI which is shaped like a dot, and the method further comprises:
extracting location and color information of the first tool UI on the frame; and
partitioning a first area having color information within a predetermined range based on the extracted color information in a location of the frame designated through the first tool UI.

15. The method according to claim 14, wherein the generating the depth information comprises automatically generating preset first depth information corresponding to the first tool UI for the partitioned first area.

16. The method according to claim 15, wherein the first tool UI comprises a first sub tool UI to adjust the preset first depth information, and
the generating the depth information comprises generating second depth information based on a user's input that is input through the first sub tool UI for the partitioned first area.

17. The method according to claim 14, wherein the tool UI further comprises a second tool UI which is shaped like a line or diagram, and the method further comprises:
extracting location information of the second tool UI on the frame; and
partitioning the frame into a plurality of second areas based on the extracted location information.

18. The method according to claim 17, wherein the generating the depth information comprises automatically generating preset third depth information corresponding to the second tool UI for the plurality of second areas.

19. The method according to claim 18, wherein the second tool UI comprises a second sub tool UI to adjust the preset third depth information, and
the generating the depth information comprises generating fourth depth information based on a user's input that is input through the second sub tool UI for at least one of the plurality of second areas.

20. The method according to claim 17, wherein the generating the depth information further comprises:
partitioning the frame into a plurality of third areas based on a user's input through the second tool UI, and
automatically generating preset fifth depth information having a first depth value to create an effect that at least one of the plurality of third areas that is disposed close to a location corresponding to a user's input through the first tool UI appears to be far from a user, and having a second depth value to create an effect that at least another one of the plurality of the third areas that is disposed further away from the location corresponding to the user's input through the first tool UI appears to be closer to the user, when a plurality of user's inputs is input through the first and second tool UIs.

21. The method according to claim 20, wherein, when the partitioning the frame into the plurality of third areas through the first and second tool UI is omitted, the generating the depth information further comprises automatically generating the preset fifth depth information, for the entire area of the frame, having the first depth value to create the effect that an area that is disposed closer to the location corresponding to the user's input through the first tool UI appear to be further away from the user and having the second depth value to create the effect that an area that is disposed further away from the location corresponding to the user's input through the first tool UI appears to be closer to the user.

22. The method according to claim 20, wherein the partitioned first, second and third areas overlap one another, and
the generating the depth information comprises generating single depth information by combining the depth information generated for each of overlapping areas.

23. A non-transitory computer-readable storage medium storing a program which, when executed by a computer, causes the computer to execute the method of claim 12.

24. An apparatus for generating depth information comprising:
a receiver which receives a two-dimensional (2D) image signal which comprises a plurality of frames;
a user interface (UI) generator which generates a tool UI to input guide information for generating depth information;
a display unit which displays a frame, for which the depth information is generated, among the plurality of frames, and the generated tool UI; and
a depth information generator which partitions an object on the displayed frame, and generates depth information corresponding to the guide information for the partitioned object based on the guide information input through the tool UI in a location within the partitioned object,
wherein the guide information, which is input through the tool UI, is input via at least one of a dot, a line, and a diagram on the frame displayed on the display unit, and
wherein the depth information generator extracts location and color information of the tool UI on the frame and partitions the frame as a plurality of areas based on the location and color information.

25. The apparatus according to claim 24, wherein the guide information is input a number of times through the tool UI in a plurality of locations within the object, and
the depth information generator generates the depth information based on a plurality of pieces of the input guide information for the object.

26. The apparatus according to claim 24, wherein the tool UI comprises a first tool UI which occupies a first area and has a predetermined shape comprising a vertex and the first tool UI is used to adjust a location of the vertex through a user input unit to adjust at least one of a size and a location of the first area.

27. The apparatus according to claim 26, wherein the first tool UI comprises a first sub tool UI to display and adjust preset depth information, and
the depth information generator generates first depth information based on a user's input that is input through the first sub tool UI for the first area designated through the first tool UI.

28. The apparatus according to claim 27, wherein the first sub tool UI is located and displayed on the vertex of the first tool UI.

29. The apparatus according to claim 24, wherein the tool UI comprises a second tool UI which is shaped like a dot,
the second tool UI comprises a second sub tool UI to display and adjust preset depth information, and
the depth information generator generates second depth information based on a user's input that is input through the second sub UI for a second area of a predetermined size centering on an area where the second tool UI is located.

30. The apparatus according to claim 29, wherein the second tool UI further comprises a third sub tool UI to adjust a size of the second area.

31. The apparatus according to claim 29, wherein the second tool UI further comprises:
   a fourth sub tool UI that is located in an edge of the second area and is used to input third depth information; and
   a fifth sub tool UI to adjust a degree of a curve of a depth value that one of gradually increases and gradually decreases between the second and third depth information.

32. The apparatus according to claim 29, wherein the second tool UI is adjusted in a location within the second area.

33. The apparatus according to claim 29, wherein the second tool UI further comprises a sixth sub tool UI to adjust at least one of a rotation and an inclination of the second area.

34. The apparatus according to claim 29, wherein the tool UI comprises a third tool UI to occupy a third area having a width of the second area and a length of a plurality of second tool UIs connected to one another, and
   the depth information generator generates the second depth information with respect to the third area.

35. The apparatus according to claim 29, wherein the tool UI further comprises a fourth tool UI which is shaped like a line that connects a plurality of second tool UIs, and
   the depth information generator extracts location information of the fourth tool UI within the object and partitions the object into a plurality of fourth areas based on the extracted location information and generates the second depth information with respect to the fourth area.

36. The apparatus according to claim 29, wherein the tool UI connects the plurality of second tool UIs and comprises a fifth tool UI to occupy a fifth area which is formed by connecting the plurality of second tool UIs, and
   the depth information generator generates the second depth information with respect to the fifth area.

37. A method for generating depth information comprising:
   receiving a two-dimensional (2D) image signal which comprises a plurality of frames;
   generating a tool user interface (UI) to input guide information for generating depth information;
   displaying a frame, for which the depth information is generated, among the plurality of frames, and the generated tool UI;
   partitioning an object on the displayed frame;
   inputting guide information through the tool UI in a location within the partitioned object; and
   generating the depth information corresponding to the input guide information for the partitioned object,
   wherein the guide information, which is input through the tool UI, is input via at least one of a dot, a line, and a diagram on the frame displayed on the display unit, and
   wherein the generating the depth information includes extracting location and color information of the tool UI on the frame and partitioning the frame as a plurality of areas based on the location and color information.

38. The method according to claim 37, wherein the generating the depth information further comprises:
   generating the depth information based on a plurality of pieces of the guide information for the object, the plurality of pieces of the guide information being input a number of times, through the tool UI in a plurality of locations within the object.

39. The method according to claim 37, wherein the tool UI comprises a first tool UI which occupies a first area and has a predetermined shape comprising a vertex, and the first tool UI is used to adjust a location of the vertex through a user input unit to adjust at least one of a size and a location of the first area.

40. The method according to claim 39, wherein the first tool UI further comprises a first sub tool UI to display and adjust preset depth information, and the generating the depth information comprises generating first depth information based on a user's input that is input through the first sub tool UI for the first area designated through the first tool UI.

41. The method according to claim 40, wherein the first sub tool UI is located and displayed on the vertex of the first tool UI.

42. The method according to claim 37, wherein the tool UI comprises a second tool UI which is shaped like a dot, and the second tool UI further comprises a second sub tool UI to display and adjust preset depth information, and the generating the depth information comprises generating second depth information based on a user's input that is input through the second sub tool UI for a preset second area in a predetermined size centering on an area where the second tool UI is located.

43. The method according to claim 42, wherein the second tool UI further comprises a third sub tool UI to adjust a size of the second area.

44. The method according to claim 42, wherein the second tool UI further comprises:
   a fourth sub tool UI that is located in an edge of the second area and is used to input third depth information; and
   a fifth sub tool UI to adjust a degree of a curve of a depth value that one of gradually increases and gradually decreases between the second and third depth information.

45. The method according to claim 42, wherein the second tool UI is adjusted in the location within the second area.

46. The method according to claim 42, wherein the second tool UI further comprises a sixth sub tool UI to adjust at least one of a rotation and an inclination of the second area.

47. The method according to claim 42, wherein the tool UI comprises a third tool UI to occupy a third area having a width of the second area and a length of a plurality of second tool UIs connected to one another, and
   the generating the depth information comprises generating the second depth information with respect to the third area.

48. The method according to claim 42, wherein the tool UI further comprises a fourth tool UI which is shaped as a line that connects a plurality of second tool UIs, and
   the generating the depth information comprises extracting location information of the fourth tool UI and partitioning the object into a plurality of fourth areas based on the extracted location information, and generating the second depth information with respect to the fourth area.

49. The method according to claim 42, wherein the tool UI connects a plurality of second tool UIs and comprises a fifth tool UI to occupy a fifth area which is formed by connecting the plurality of second tool UIs, and
   the generating the depth information comprises generating the second depth information with respect to the fifth area.

50. A non-transitory computer-readable storage medium storing a program which, when executed by a computer, causes the computer to execute the method of claim 37.

* * * * *